(12) United States Patent
Bargeron et al.

(10) Patent No.: US 7,917,492 B2
(45) Date of Patent: Mar. 29, 2011

(54) METHOD AND SUBSYSTEM FOR INFORMATION ACQUISITION AND AGGREGATION TO FACILITATE ONTOLOGY AND LANGUAGE-MODEL GENERATION WITHIN A CONTENT-SEARCH-SERVICE SYSTEM

(75) Inventors: David Bargeron, Seattle, WA (US); Vijay Chemburkar, Seattle, WA (US); Nicholas Charles Stielau, Seattle, WA (US); Jonathan Thompson, Seattle, WA (US)

(73) Assignee: Limelight Networks, Inc., Tempe, AZ (US)

( * ) Notice: Subject to any disclaimer, the term of this patent is extended or adjusted under 35 U.S.C. 154(b) by 317 days.

(21) Appl. No.: 12/077,591

(22) Filed: Mar. 19, 2008

(65) Prior Publication Data
US 2009/0083257 A1   Mar. 26, 2009

Related U.S. Application Data

(63) Continuation-in-part of application No. 11/903,279, filed on Sep. 21, 2007.

(51) Int. Cl.
*G06F 17/30* (2006.01)
(52) U.S. Cl. ........ 707/708; 707/709; 707/711; 707/740; 707/741; 707/755; 707/770; 707/771
(58) Field of Classification Search .................. 707/708, 707/709, 711, 740, 741, 755, 770, 771
See application file for complete search history.

(56) References Cited

U.S. PATENT DOCUMENTS

| 6,192,360 | B1 * | 2/2001 | Dumais et al. ..................... 1/1 |
| 6,553,365 | B1 * | 4/2003 | Summerlin et al. .......... 707/740 |
| 6,665,640 | B1 * | 12/2003 | Bennett et al. ................ 704/257 |
| 6,675,159 | B1 * | 1/2004 | Lin et al. ............................. 1/1 |
| 6,877,002 | B2 | 4/2005 | Prince |
| 6,901,398 | B1 * | 5/2005 | Horvitz et al. ................ 709/207 |
| 7,185,008 | B2 | 2/2007 | Kawatani |
| 7,257,577 | B2 * | 8/2007 | Fagin et al. ........................ 1/1 |
| 7,519,565 | B2 * | 4/2009 | Prakash et al. .................. 706/20 |
| 7,673,234 | B2 * | 3/2010 | Kao et al. ...................... 715/255 |

(Continued)

FOREIGN PATENT DOCUMENTS
KR   20030014804 A   2/2003

OTHER PUBLICATIONS

U.S. Appl. No. 11/903,279, Office Action dated Jul. 29, 2010, 9 pages.

(Continued)

*Primary Examiner* — Wilson Lee
*Assistant Examiner* — Thanh-Ha Dang
(74) *Attorney, Agent, or Firm* — Kilpatrick Townsend & Stockton LLP

(57) ABSTRACT

Various embodiments of the present invention include information-aggregation-and-classification components of content-search-service systems which acquire information from information sources, aggregate and normalize the acquired information, and classify the acquired information prior to storing the normalized and classified information for use by language-model-builder components and ontology-builder components of the content-search-service systems. Additional embodiments of the present invention include the ontology-builder components, which builds ontologies from the normalized and classified information for specific dates, date/times, date ranges, or date/time ranges and for specific categories.

17 Claims, 24 Drawing Sheets

U.S. PATENT DOCUMENTS

| | | | |
|---|---|---|---|
| 7,743,061 B2 * | 6/2010 | Jones et al. | 707/741 |
| 2002/0022956 A1 * | 2/2002 | Ukrainczyk et al. | 704/9 |
| 2003/0037073 A1 * | 2/2003 | Tokuda et al. | 707/500 |
| 2004/0102958 A1 | 5/2004 | Anderson | |
| 2005/0004897 A1 | 1/2005 | Lipson et al. | |
| 2005/0022106 A1 | 1/2005 | Kawai et al. | |
| 2005/0222975 A1 * | 10/2005 | Nayak et al. | 707/3 |
| 2005/0262050 A1 * | 11/2005 | Fagin et al. | 707/3 |
| 2006/0031217 A1 | 2/2006 | Smith et al. | |
| 2006/0047632 A1 | 3/2006 | Zhang | |
| 2006/0155693 A1 | 7/2006 | Chowdhury et al. | |
| 2006/0248458 A1 | 11/2006 | Li | |
| 2006/0288015 A1 * | 12/2006 | Schirripa et al. | 707/100 |
| 2008/0077583 A1 | 3/2008 | Castro et al. | |
| 2008/0126319 A1 * | 5/2008 | Bukai et al. | 707/3 |
| 2009/0083256 A1 | 3/2009 | Thompson et al. | |
| 2009/0174526 A1 | 7/2009 | Howard et al. | |

OTHER PUBLICATIONS

U.S. Appl. No. 12/077,590, Office Action dated Jun. 7, 2010, 16 pages.

* cited by examiner

Legend: Arcs Are Labeled with Numeric Value for the Co-occurrence Metric

|   | to | from | metric |
|---|---|---|---|
| 0 | 4 | 6 | 0.61 |
| 1 | 4 | 18 | 0.32 |
| 2 | 4 | 861 | 0.21 |
|   | 4 | 416 | 0.22 |
|   | 4 | 200 | 0.47 |
|   | 7 | 500 | 0.16 |
|   | 7 | 10 | 0.19 |
|   | 7 | 26 | 0.52 |
|   | 9 | 361 | 0.41 |
|   | 9 | 550 | 0.18 |
|   | 9 | 200 | 0.67 |
|   | 9 | 17 | 0.73 |
|   | 9 | 36 | 0.21 |
|   | 9 | 411 | 0.30 |
|   | 10 | 107 | 0.15 |
|   | 10 | 263 | 0.91 |
|   | 11 | 313 | 0.27 |
|   | 11 | 802 | 0.25 |
|   | 11 | 761 | 0.16 |
|   | 11 | 660 | 0.77 |
|   | 11 | 25 | 0.31 |
|   | 16 | 81 | 0.23 |
|   | 16 | 393 | 0.22 |
|   | 21 | 13 | 0.18 |
|   | 21 | 18 | 0.55 |
|   | 21 | 441 | 0.16 |
|   | 21 | 302 | 0.43 |
|   | 1621 | 961 | 0.30 |
| up to $m$-1 | 1621 | 877 | 0.35 | ontology

Figure 8

| | 908 (First Element) | 910 (Second Cell) | 904 (Numeric Value) | 905 (Numeric Value) | 906 (Numeric Value) | 902 (Ontology List) |
|---|---|---|---|---|---|---|
| 0 | 4 | 6 | 1876 | 2036 | 16781 | |
| 1 | | | | | | |
| 2 | | | | | | |
| 3 | | | | | | |
| ⋮ | | | | | | |
| | | | | | | |
| | | | | | | |
| | | | | | | |
| | | | | | | |
| | | | | | | |
| | | | | | | |
| | | | | | | |

Fig. 9

| | | |
|---|---|---|
| 161 | 0.5 | .36 | ← 1304 (Tuple)
| 87 | 3.25 | .87 |
| 19 | 5.25 | .12 |
| . | . | . |
| . | . | . |
| . | . | . |
| . | . | . | ← 1302 (Row)

Fig. 13

| | |
|---|---|
| 51 | chart price armadillo month |
| 52 | armadillo | p1

| | |
|---|---|
| 51 | armadillo protein |
| 52 | armadillo house building family yard |
| 53 | armadillo hide purse shoe undergarment coat clothing accessory |
| 54 | armadillo | p2

| | |
|---|---|
| 51 | armadillo |
| 52 | |
| 53 | | p3

~ 1634

↑ 1632

| | |
|---|---|
| 51 | chart price armadillos months |
| 52 | Armadillos people organizations | p1

| | |
|---|---|
| 51 | Armadillos source protein |
| 52 | Armadillos houses building families yards |
| 53 | Armadillo hide manufacture purses shoes undergarments coats items clothing accessories |
| 54 | Armadillos companions children elderly | p2

| | |
|---|---|
| 51 | links armadillo sites |
| 52 | ways armadillos |
| 53 | | p3

| | |
|---|---|
| 51 | chart    price    armadillo    month |
| 52 | armadillo |

| | |
|---|---|
| 51 | armadillo    protein |
| 52 | armadillo    house    building    family    yard |
| 53 | armadillo    hide    purse    shoe<br>undergarment    coat    clothing    accessory |
| 54 | armadillo |

| | |
|---|---|
| 51 | armadillo |
| 52 | |
| 53 | |

1704

| 1 | 1 | 1 | 1 | 1 | 1 | 1 | 1 | 1 | 1 | 1 | 1 | 1 |
|---|---|---|---|---|---|---|---|---|---|---|---|---|
| family | yard | hide | purse | shoe | under-<br>garment | coat | clothing | accessory | | | | |

| 1 | 1 | 1 | 1 | 1 | 1 | 1 |
|---|---|---|---|---|---|---|
| chart | price | armadillo | mouth | protein | house | building |

1706 cumulative term distribution

METHOD AND SUBSYSTEM FOR INFORMATION ACQUISITION AND AGGREGATION TO FACILITATE ONTOLOGY AND LANGUAGE-MODEL GENERATION WITHIN A CONTENT-SEARCH-SERVICE SYSTEM

CROSS-REFERENCE TO RELATED APPLICATION

This application is a continuation-in-part of application Ser. No. 11/903,279, filed Sep. 21, 2007.

TECHNICAL FIELD

The current invention is related to searching content, including video files with audio tracks, to identify portions of the content related to search-query terms and phrases, and, in particular, to an information-aggregation-and-classification component of a content-search-service system that employs an ontology and a transcript to score the transcript for use by a search-service component of the content-search-service to render search results to a client of the content-search-service system.

BACKGROUND OF THE INVENTION

In the early days of computing, information was generally encoded as formatted alphanumeric character strings or as unformatted ordered sequences of information-storage units, typically bytes. As computing hardware, operating systems, and computer applications have together evolved, many different types of information encodings have been developed, and a very large variety of different types of information are now routinely electronically encoded, stored, exchanged, and rendered for access by users, including text files, specially formatted application-specific files, audio recordings, video recordings, and multimedia presentations. While, in early days of computing, data was primarily rendered as character strings displayed on monochromatic, 24-line terminals, the many different types of information currently electronically encoded and distributed by computer systems are rendered for presentation to human users by a variety of different application programs, including text and image editors, video players, audio players, and web browsers.

An important class of information comprises information encoded as an ordered sequence of information units that are sequentially rendered for display or presentation to a human user. An MPEG-encoded video file is one example of a sequentially ordered information encoding. MPEG encoding employs a number of rather complex layers of different types of encoding methods to compactly encode one or more video streams and/or audio streams. In general, video frames are reconstructed from an MPEG-encoded video file frame-by-frame, in sequence. Rendering of an MPEG-encoded video file provides a stream of video frames and an audio stream. Rendering applications and devices generally allow a user to start or resume rendering of the video file, to stop rendering of the video file, and to skip forward or backward to selected positions within a video stream.

In many cases, a user may only be interested in a certain portion of a video presentation. For example, a particular user may be interested only in a weather report included in a local television news broadcast that includes reviews of current local and national events, reviews of sporting events, and presentations of human-interest stories in addition to the weather report. In many cases, video presentations may not be indexed by sections, in order to facilitate direct access to portions of the video presentation of interest to a user, or may be indexed at a very coarse topic granularity, requiring a user to employ a hit-or-miss strategy of starting, stopping, advancing, and reversing the video stream by relatively crude techniques in order to locate portions of interest. In addition to encoded video, there are many other types of sequentially ordered information encodings that are sequentially rendered for human perception, including pure audio recordings, various types of multimedia presentations, images of pages within books and text documents, and other such information encodings. In many cases, searching for portions of the encoded information of interest to human users is currently limited to the above-described stop/start/advance/and reverse operations familiar to users of video-rendering applications and many video-signal-rendering devices.

Designers and manufacturers of computers and other electronic devices that render sequentially ordered information encodings for presentation to human users, designers, implementers, vendors and users of information-rendering applications, including media players, web browsers, and control programs, and many others involved in recording, disseminating, and rendering information have recognized the need for more effective searching tools to allow users to identify and efficiently access portions of an information encoding of interest to those to whom the information is rendered. In response to these needs, a content-search-service system has been developed. Various embodiments of the present invention comprise components and subsystems of this content-search-service system. The content-search-service system receives and/or locates and retrieves various content items electronically available to clients of the content-search-service system and prepares internal representations of the content items, or portions of the content items, to enable the content-search-service to graphically render search results generated by the content-search-service system in response to search requests made by clients of the content-search-service system. Designers, developers, and manufacturers of content-search-service systems, as well as content-search-service providers and users of content-search-service systems and services provided by content-search services, have all recognized the need for efficient and accurate content-search-service components to facilitate rapid and accurate responses to search requests directed to content items received from clients of content-search services that employ content-search-service systems.

SUMMARY OF THE INVENTION

Various embodiments of the present invention include information-aggregation-and-classification components of content-search-service systems which acquire information from information sources, aggregate and normalize the acquired information, and classify the acquired information prior to storing the normalized and classified information for use by language-model-builder components and ontology-builder components of the content-search-service systems. Additional embodiments of the present invention include the ontology-builder components, which builds ontologies from the normalized and classified information for specific dates, date/times, date ranges, or date/time ranges and for specific categories.

BRIEF DESCRIPTION OF THE DRAWINGS

FIG. 8 shows a list representation of an ontology, according to one embodiment of the present invention.

FIG. 9 shows a portion of an ontology representation used in one embodiment of the present invention.

FIG. 13 illustrates one embodiment of a scored transcript, according to one embodiment of the present invention.

FIGS. 16A-B illustrate a document filtering and normalization method employed in one embodiment of the present invention.

FIG. 17 shows a term vector generated from the normalized text document shown in FIG. 16B.

DETAILED DESCRIPTION OF THE INVENTION

Figure 1:
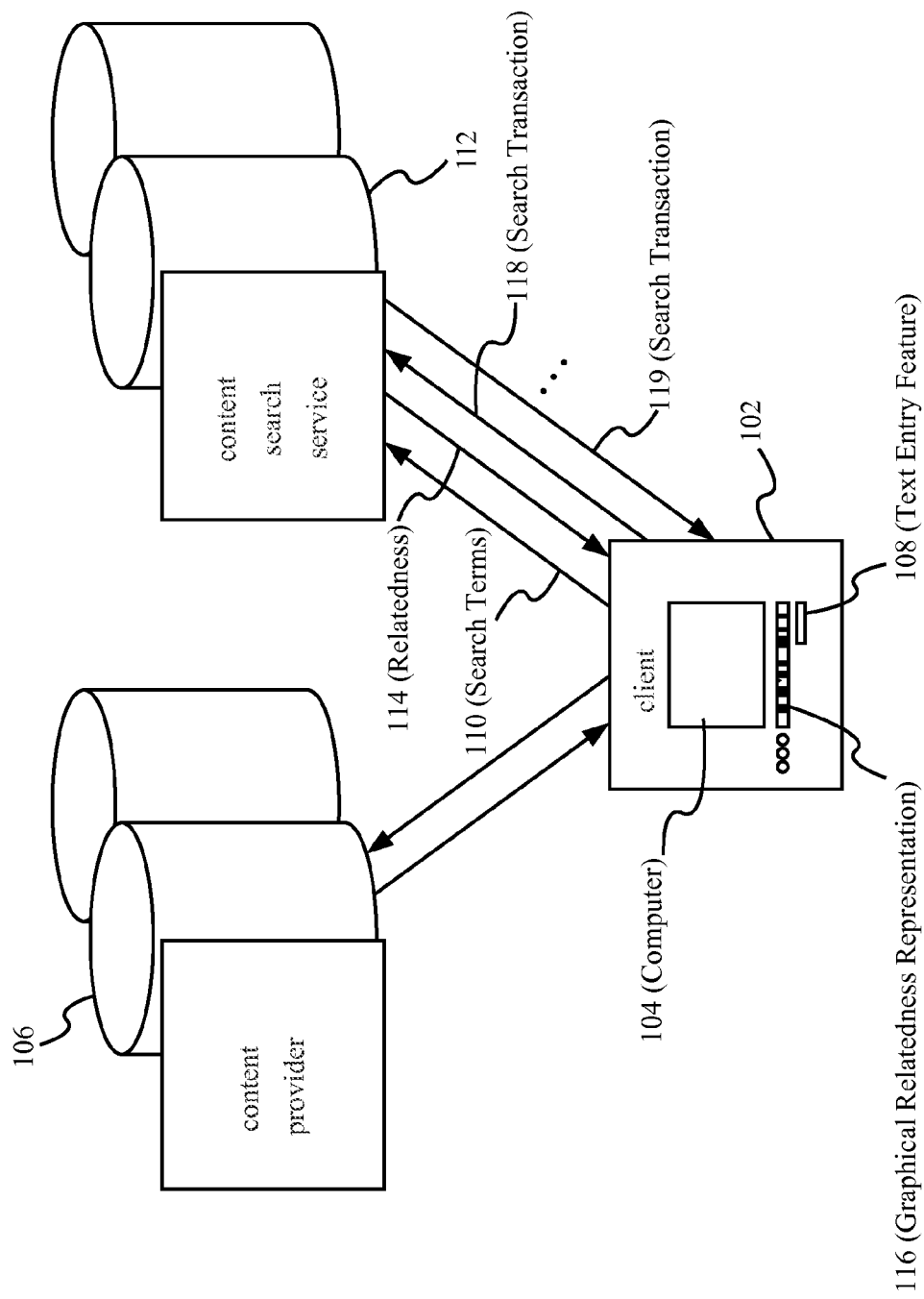
FIG. 1 illustrates provision of search services to a client by a content-search-service system.

Embodiments of the present invention are employed within content-search-service systems that are used to provide content-search services to clients. FIG. 1 illustrates provision of search services to a client by a content-search-service system. The client 102 is generally a personal computer or work station employed by a user to view content 104, provided by a content-provider system 106, via a content-rendering application, such as a video-rendering program invoked by a web browser. In order to facilitate efficient viewing of the content, the user enters a search query, comprising a search term or a search phrase, into a text-entry feature 108 displayed on the client computer and invokes a search of the content being rendered for related portions of the content. In certain embodiments of the present invention, search queries may alternatively be predefined by or for users to facilitate user searching. The search terms or phrases are transmitted 110 to a content-search-service system 112 and processed by the content-search-service system in order to return 114 a graphical rendering of the relatedness of particular portions of the content 116 to the search term or search phrase. The user of the client computer can carry out additional searches for additional search terms or phrases via additional search transactions 118-119.

In general, the content rendered to the user is a type of content that, unlike a text file, cannot be easily searched using commonly available search tools, such as search facilities provided within text editors, in order to find portions of the content of particular interest to the user. In the discussion that follows, the content is assumed to be a video file with an accompanying audio track, such as a news broadcast or sports broadcast provided by a news service or sports service through the Internet to accessing users. However, content-search-service systems, in which embodiments of the current invention may be implemented and employed, may provide search services for a variety of different types of content, from multi-media presentations to various types of images, graphics, and musical selections, including various types of audio content.

In general, the content provider 106 provides content items to the content-search-service system 112 for preprocessing, to facilitate rapid responses to subsequent client search requests directed to the content items. However, in alternative implementations, the content-search-service system may concurrently receive the content item and search phrase or search term from a client, process the content item to prepare for searching the content, carry out the search request, and render results to the user in real time. In general, client systems are distinct from both content-provider systems and content-search-service systems, although it is possible that the content provider, client, and content-search service may all execute concurrently or simultaneously within a single computer system or distributed computer system.

Figure 2:
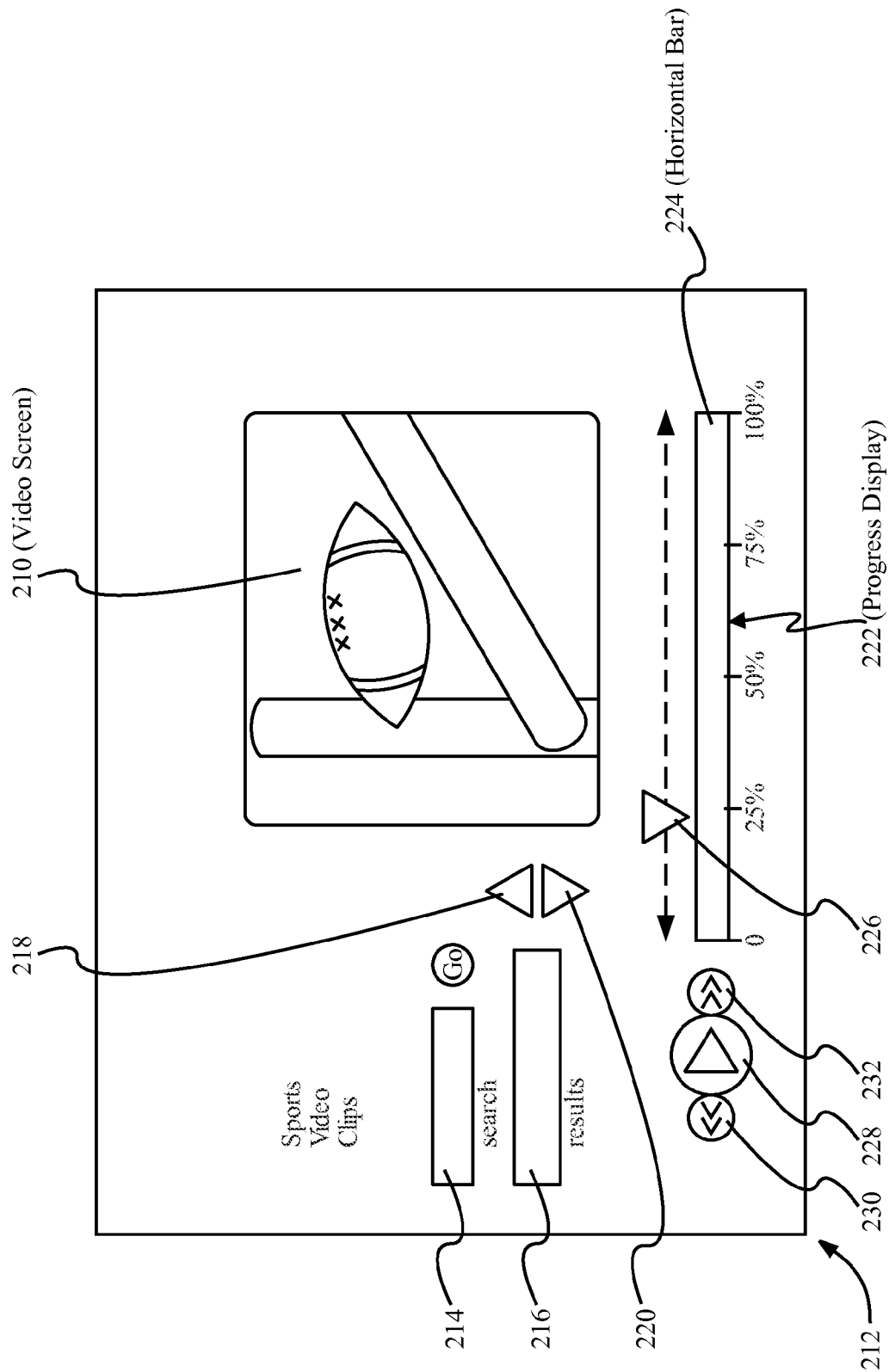
FIG. 2 illustrates a content-rendering application interface.

FIG. 2 illustrates a content-rendering application interface. Video is displayed within a video screen 210 provided by a web-page-based video-clip viewing interface or portable device graphical user interface ("GUI") 212. The device interface or web page provides a text-entry window 214 that allows a user to input text to serve as search criteria for finding desired videos to view, displaying the results of each search in a results window 216 that can be scrolled by scroll-up 218 and scroll-down 220 buttons and from which a video can be selected for display. In addition, a progress display 222 displays, to a user, an indication of the current position within a video clip being displayed during rendering of the video clip, with the entire length of the video clip represented by horizontal bar 224 and the current position within the video clip indicated by the position of a position indicator 226 with respect to the horizontal bar. In FIG. 2, the position indicator 226 indicates that the currently displayed video frame occurs at a position 25% of the way through the video clip. The user interface provides a start/stop button 228 for starting and stopping video clip display, as well as a backward-advance button 230 and forward-advance button 232 that allow the user to seek different positions within the video clip without watching intervening frames.

Figure 3:
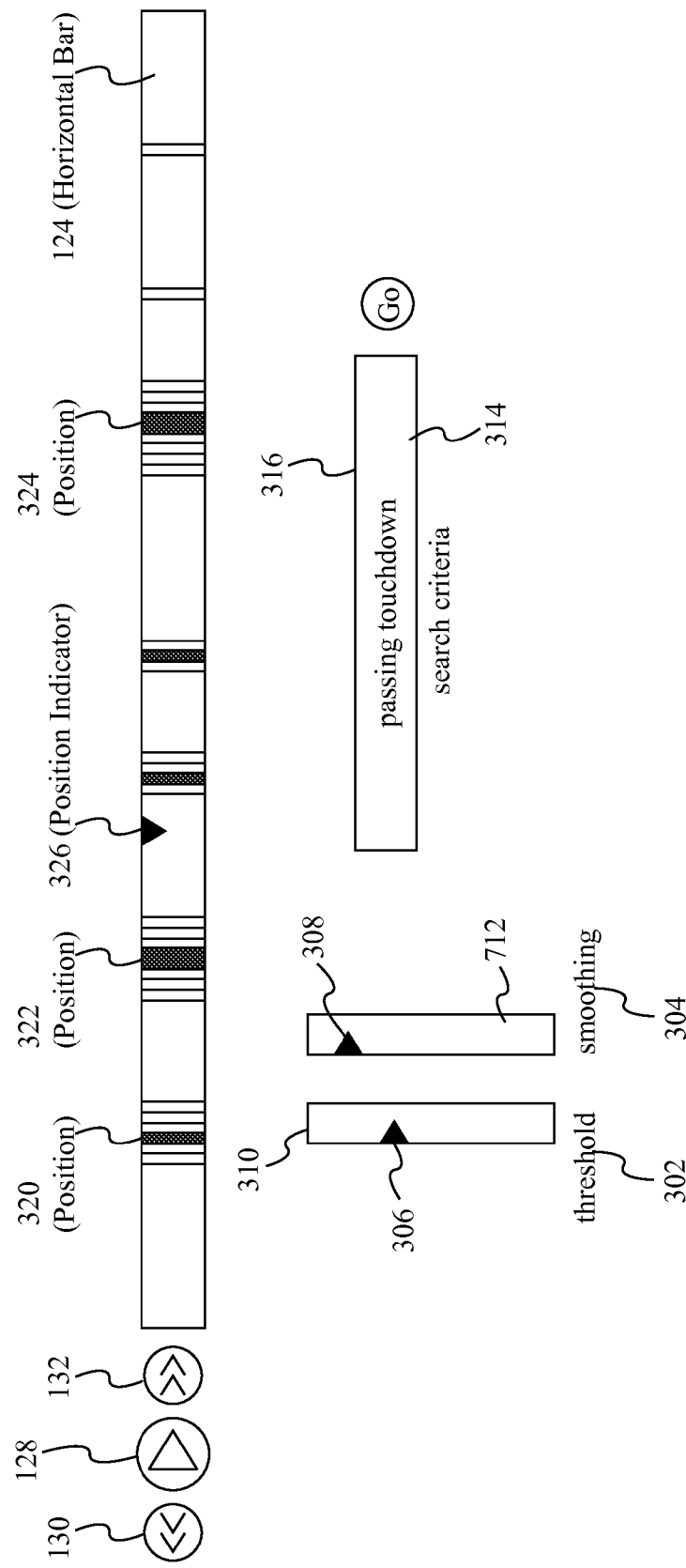
FIG. 3 illustrates a heat-map search-results display that is added to the content-rendering application interface shown in FIG. 2 according to embodiments of the present invention.

FIG. 3 illustrates a heat-map search-results display that is added to the content-rendering application interface shown in FIG. 2 according to embodiments of the present invention. The heat-map search-results display may be provided by a client-side search-results-rendering application downloaded from a content-search-service system. FIG. 3 shows the navigational buttons and progress display of the video-clip viewing interface shown in FIG. 2, along with additional search-results-display features. The backward-advance 130, forward-advance 132, and start/stop 128 buttons have functions in the visual interface identical to the functions described for these interface features of the video-clip viewing interface shown in FIG. 2. The progress display 124 and 126 also has an identical function to that of the video-clip viewing interface shown in FIG. 2, with the exception that, rather than showing a simple, solid-color horizontal bar to represent the extent of the video clip, as in FIG. 2, a heat-map-like representation of a relatedness function is superimposed within the horizontal bar 124 of the progress display. In this heat-map-like representation, darker shading represents relatedness metrics, or scores, of larger magnitude. The visual interface also includes two parameter-specification features 302 and 304 that allow a user to specify, by sliding indicator buttons 306 and 308, respectively along columns 310 and 312, the degree of thresholding and smoothing to employ when computing the relatedness metrics, or scores, for positions within an information encoding with respect to a search criterion 314 specified by the user within a search-criteria-entry window 316. In the example shown in FIG. 3, the horizontal bar 124 of the progress-display component represents the extent of a video clip, and one can easily determine, by visual inspection of the heat map superimposed within the horizontal bar 124, that content related to the currently-specified search criterion may be most probably found at positions 320, 322, and 324. A simpler visual interface may include only a heat-map-like representation of a relatedness function, and may rely on selection features of an existing GUI for inputting search criteria. More complex visual interfaces may include additional selection features to allow additional parameters that control the display of the visual interface and computation of the relatedness function to be specified by a user, including subject-matter domain, for example. Of course, as with all visual interfaces, there are many different ways, and types of selection and input features, that may be used to provide user input of parameters, search criteria, and other input data. In addition, a visual interface may support multiple methods for inputting any particular input data. For example, in the visual interface shown in FIG. 3, a user may be able to select a position at which to start or resume rendering of the information encoding by using the backward-advance and forward-advance buttons, by moving the position indicator, or by inputting a mouse click after moving a pointer to the position as represented by a location within the horizontal bar of the progress-display component.

Figure 4:
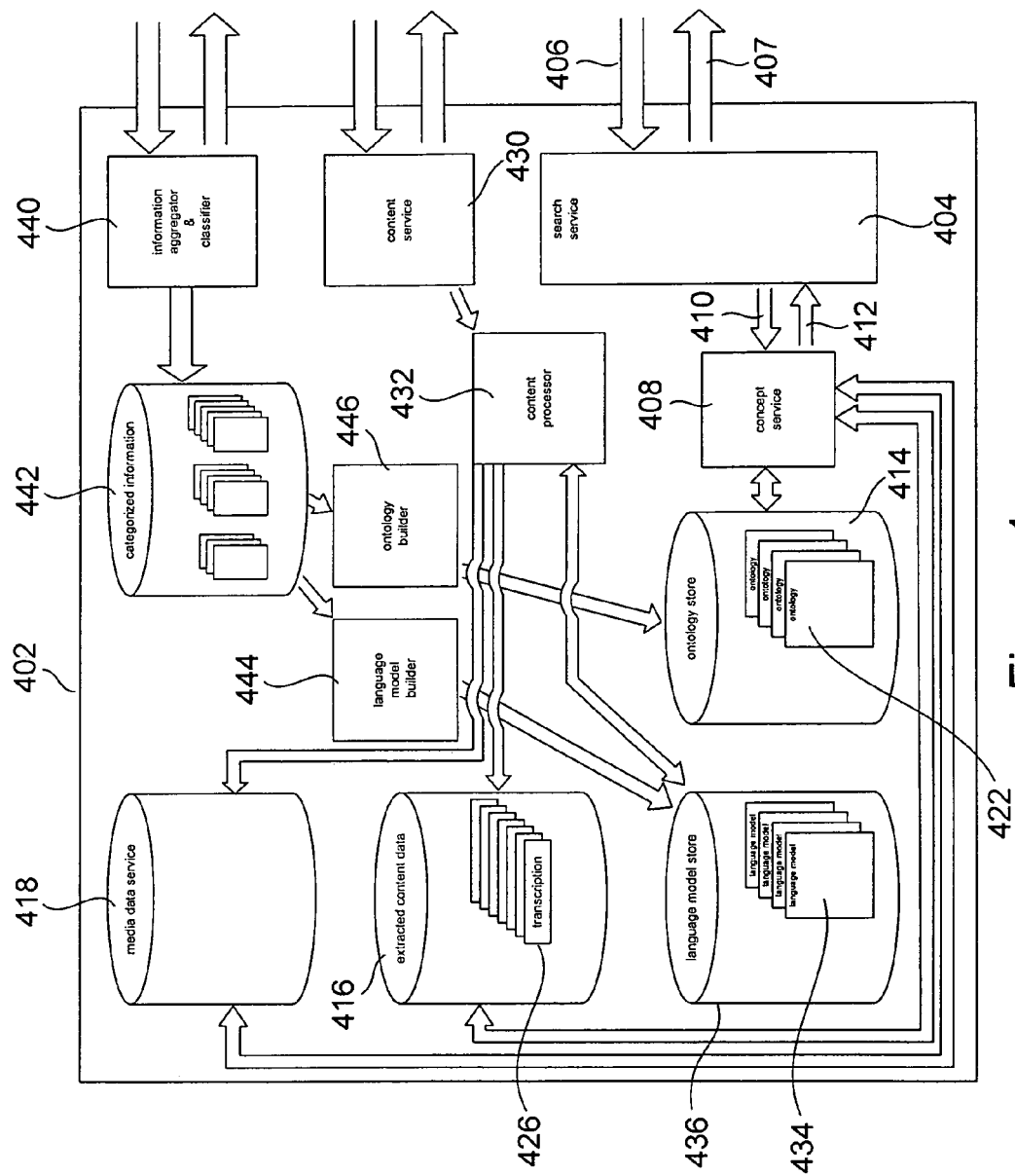
FIG. 4 provides a block-diagram representation of a content-search-service system that represents one embodiment of the present invention.

FIG. 4 provides a block-diagram representation of a content-search-service system that represents one embodiment of the present invention. The content-search-service system ("CSS system") 402 includes a search-service component 404 that receives search requests from clients and responds with search results that are rendered by search-result-rendering applications running on client computers. In one embodiment of the present invention, search requests and responses to search requests are received 406 and transmitted 407 over the Internet according to the web-services protocol in extensible markup language ("XML") messages. A search request includes a content identifier ("Content ID") and a search query, comprising a search term or search phrase. Both of these items are passed, by the search-service component 404, to a concept-service component ("CS component") 408 for processing. The CS component 408 returns a scored transcript 412, or scored portions of a transcript, to the search-service component 404, which uses the scored transcript, and, optionally, a vocabulary returned by the concept-service component, to produce search-result information that is rendered to a user on the client computer. A scored transcript, or partially scored transcript, is, in described embodiments of the present invention, a time-ordered list of tuples, each tuple containing an indication of a term or phrase, the elapsed time, during rendering of a media-content item, at which the term or phrase occurs, and a score that indicates the degree of relatedness of the term or phrase to the search query received by the CS component. The CS component accesses an ontology store 414, an extracted-content-data component 416, and a media-data service 418 in order to obtain an ontology, a transcript, and other information needed by the CS component to score a transcript for return to the search-service component 404. An ontology is, in described embodiments of the present invention, a fully interconnected graph of terms and phrases. Each node of the graph represent a terms or phrase, and each edge of the graph represents the observed co-occurrence relationship of the terms or phrases represented by the nodes connected by the edge within collected information that is analyzed to produce the ontology. Each edge is assigned a weight that reflects the strength of the co-occurrence relationship represented by the edge, and weights are derived from the collected information that is analyzed to produce the ontology. The ontology store 414 includes a number of ontologies, such as ontology 422, which describe co-occurrence relationships between words for various categories of subject matter. Ontologies are also date stamped, or date/time stamped, since ontologies change, over time, for any particular subject matter, and an ontology with a date/time stamp indicating a date within a reasonable offset, in time, from the data of a content item to be searched is most useful for preparing search results. The extracted-content-data component 416 stores one or more transcripts 426 for each content item that has been pre-processed by the CSS system. The media-data service 418 stores information related to each pre-processed content item, including the category of subject matter to which the content item belongs and the date or date and time of creation or reception of the content.

The CSS service additionally includes a content-service component 430 that receives content items from remote content providers, or that searches for, finds, and retrieves content items provided by content providers, and furnishes the content items to a content-processor component 432 that prepares and stores one or more transcripts 426 for each processed content item in the extracted-content-data component 416. The content processor 432 accesses a language model, such as language model 434, stored in a language-model store 436, in order to process a given content item. The content-processor component 432 also deposits additional information about content items in the media-data-service component 418. In the described embodiments of the present invention, transcripts are text-based transcripts of audio tracks and audio files, carried out by automatic-speech-recognition subcomponents of the content processor component. In alternative embodiments of the present invention, text transcripts may be prepared from other types of media content, including descriptive transcripts of still or moving images prepared by computer-vision subcomponents of the content processor component.

An information-aggregator-and-classifier component 440 continuously, or at intervals, searches through information available on the Internet and other information sources for documents, text files, and other information items related to various different categories to which content items may be assigned. The information-aggregator-and-classifier component 440 classifies those information items deemed to be useful to the CSS system by category, and stores the information items, for each category and for particular ranges of dates and times, into a categorized-information-storage component 442. These information items are processed by the information-aggregator-and-classifier component to remove unnecessary information, linguistically normalize terms and phrases, and compute various parameters and values associated with the information items that are used both by the information-aggregator-and-classifier component to classify the items as well as by the language-model-builder component 444 and ontology-builder component 446, which use the information items stored in the categorized-information-storage component 442 to build language models and ontologies, respectively.

Figure 5:
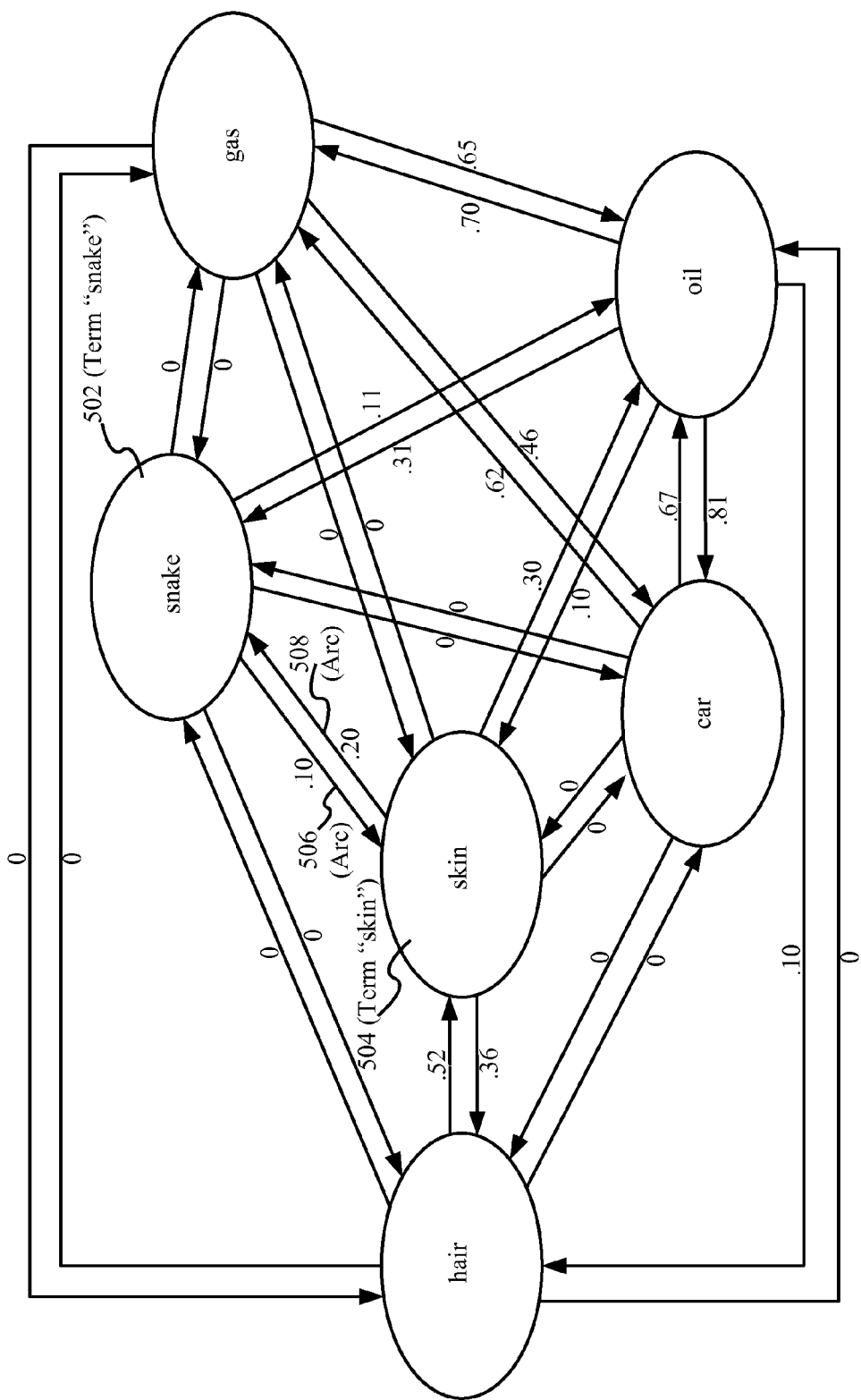
FIG. 5 illustrates an ontology according to one embodiment of the present invention.

FIG. 5 illustrates an ontology according to one embodiment of the present invention. FIG. 5 is a simplified ontology containing only a very few terms. Actual ontologies prepared for useful information categories may contain many hundreds, thousands, or millions of terms and phrases. In FIG. 5, each of six terms is represented by oval nodes, such as oval node 502 representing the term "snake." Each possible pair of terms, such as the pair of terms "snake" 502 and "skin" 504, are interconnected by two arcs, such as arcs 506 and 508 interconnecting terms 502 and 504. The two arcs form a bi-directional pair, one arc of the pair directed from a first term or phrase (source term or source phrase for the arc) to a second term or phrase (target term or target phrase for the arc), and the second arc of the pair directed from the second term or phrase to the first term or phrase. Each arc is labeled with a numeric value in the range [0.0, 1.0]. The numeric value is a normalized co-occurrence metric that indicates a frequency at which the target term or phrase of the arc co-occurs with the source term or phrase of the arc. Thus, in FIG. 5, arc 506 indicates that the term "snake" co-occurs at a relatively low frequency with the term "skin," while the term "skin" co-occurs at a somewhat higher frequency with the term "snake." The fact that the co-occurrence metrics for the two arcs in a bi-directional pair of arcs interconnecting two terms or phrases are not equal reflects different distributions of the terms or phrases and different numbers of occurrences of the terms or phrases in the many information items from which the ontologies are prepared, as well as different normalizations for the two terms or phrases. Referring back to FIG. 4, the ontologies, such as the simple ontology shown in FIG. 5, are prepared by the ontology-builder component 446 of the CSS system by analyzing a large number of information items related to a particular category and collected over a particular interval of time. Thus, each ontology, such as the ontology illustrated in FIG. 5, is associated with a particular category of information and is stamped with a date and/or date/time corresponding to the date or date and time, respectively, when the information entities used by the ontology builder component to build the ontology were collected by the information-aggregator-and-classifier component 440 of the CSS system 402.

Each ontology is physically or conceptually associated with a vocabulary. The vocabulary is also prepared from information items collected by the information-aggregator-and-classifier component (440 in FIG. 4) of the CSS system. In certain embodiments, the vocabulary for a category of information is prepared by the language-model-builder component (444 in FIG. 4) of the CSS system and stored in the language-model store (436 in FIG. 4). In other embodiments of the present invention, the vocabulary may be constructed by the ontology-builder component (446 in FIG. 4) and stored in the ontology store (414 in FIG. 4), and in still alternative embodiments, the vocabulary may be constructed by yet an additional component of the CSS.

Figure 6:
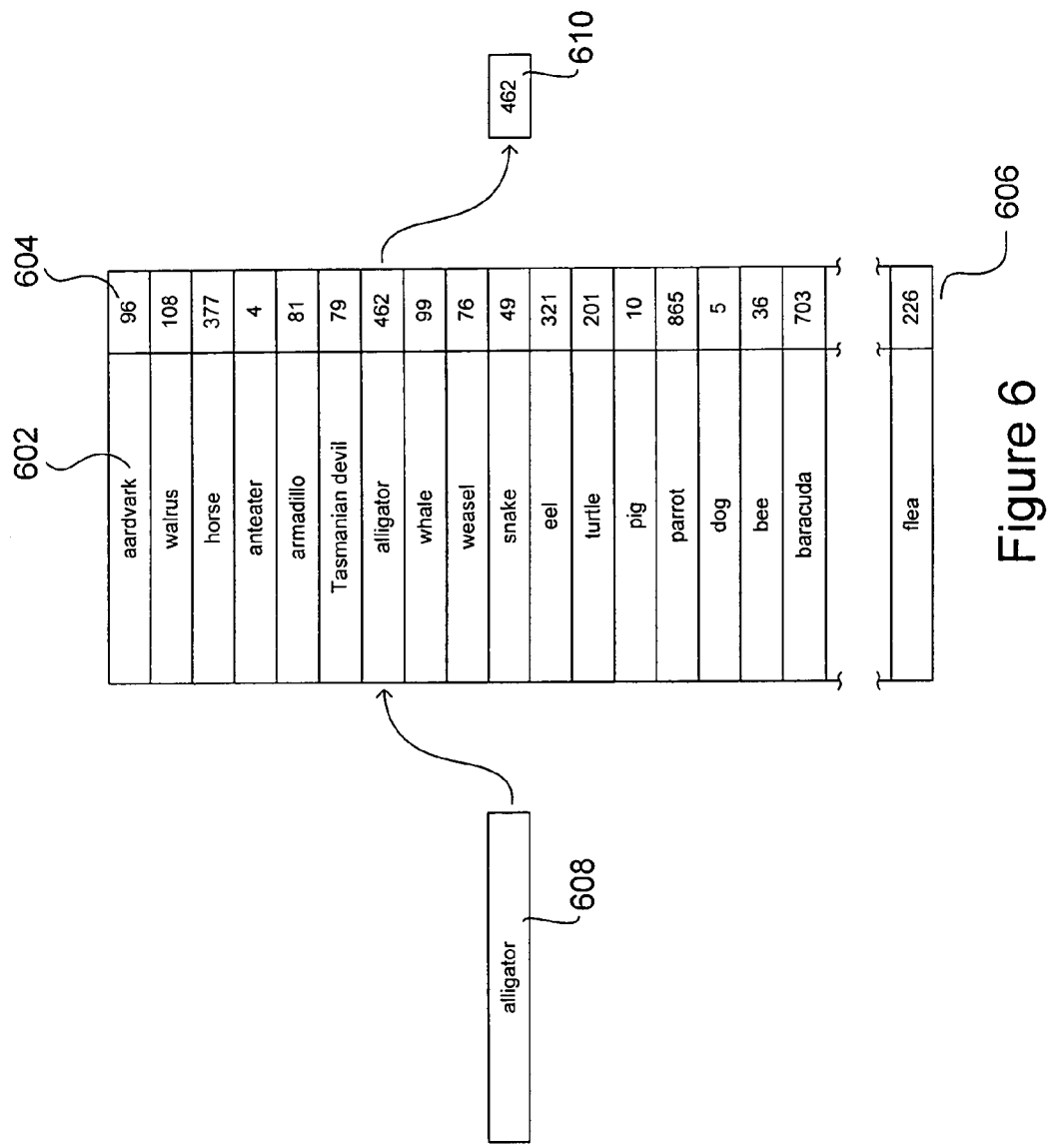
FIG. 6 shows a portion of an exemplary vocabulary for the category "animals," according to one embodiment of the present invention.

A vocabulary comprises a list of nouns, or noun phrases, in one embodiment of the present invention, that commonly occur in information items related to a particular information category. For example, a sports category for content items might be expected to include nouns such as "bat," "base," "pitcher," "quarterback," "goalpost," "football," "javelin," "roller derby," and other such nouns and noun phrases. Because it is inefficient to programmatically manipulate strings of symbols, such as character strings, when implementing components of the CSS system, each term or phrase in a vocabulary is represented by an integer value. FIG. 6 shows a portion of an exemplary vocabulary for the category "animals," according to one embodiment of the present invention. As can be seen in FIG. 6, the character-string representation of the name of each animal, such as the character string "aardvark" 602, is associated with a small-integer value, such as the value "96" 604 in the table 606 that constitutes a vocabulary for the information category "animals." Using this table, the character string "alligator" 608 is easily translated to the integer "462" 610 by a table-lookup operation. As with any computationally processed and electronically stored data, the vocabulary can be ordered in alphabetical order and/or numeric order, and may be additionally associated with indexes or other additional information to allow terms and phrases to be quickly located in the table and accessed.

Figure 7:
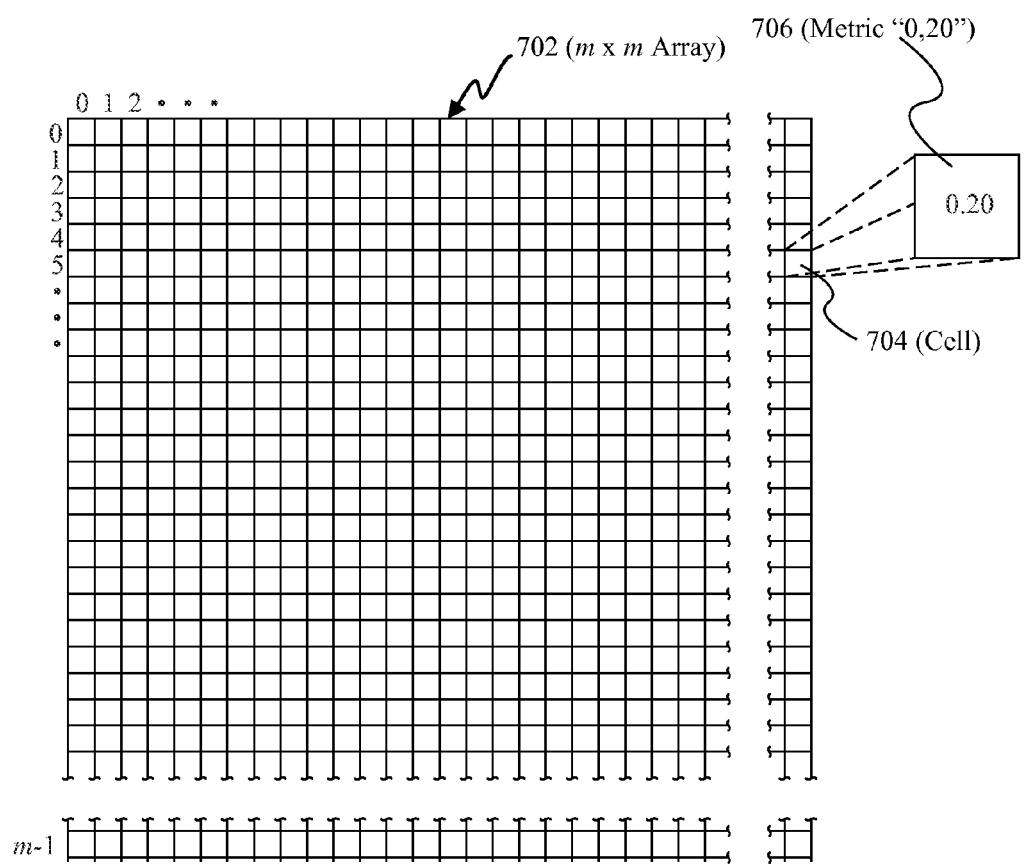
FIG. 7 illustrates an m×m representation of an ontology, according to one embodiment of the present invention.

While it is convenient to represent an ontology as a graph that includes term and phrase nodes interconnected by arcs, as shown in FIG. 5, an ontology can be more easily manipulated, computationally, when represented as an m×m array, where m is the number of terms and phrases of a particular vocabulary. FIG. 7 illustrates an m×m representation of an ontology, according to one embodiment of the present invention. The m×m array 702 comprises $m^2$ cells, each cell, such as cell 704, containing one or more co-occurrence metrics that label an arc, such as arc 508 in FIG. 5, emanating from a first ontology node, such as node 502 in FIG. 5, and directed to a second ontology node, such as node 504 in FIG. 5. The row index of the cell indicates the integer value corresponding to the first node, from which the arc emanates, and the column index of the cell indicates the second node, to which the arc is directed. Cell 704 has array indices (5, m−1), indicating that the co-occurrence metrics included in the cell, such as metric "0.20" 706 in FIG. 7, label an arc from the vocabulary word or phrase specified by the integer "5" to the vocabulary term or phrase specified the integer $m^{-1}$.

The m×m representation of an ontology, shown in FIG. 7, is a useful abstraction, but is generally also computationally inefficient. One reason that this representation is inefficient is that, for practical ontologies, co-occurrence metrics below a threshold value are considered to be meaningless, and are all assigned a minimum value, such as the value "0.0." Therefore, the m×m array, shown in FIG. 7, is generally quite sparse. For that reason, and to facilitate rapid access to particular co-occurrence metrics for particular words and phrases of the vocabulary, the ontology is normally represented as a list. FIG. 8 shows a list representation of an ontology, according to one embodiment of the present invention. In FIG. 8, each element of the list 802, such as element 804, is represented as a row containing three cells. The first cell 806 of row 804 is the numeric representation of the target of an arc in the graph representation of an ontology, the second cell 808 is the source of an arc, in the graphical representation of an ontology, and the third cell 810 contains the co-occurrence metric by which the arc is labeled. Only entries with non-zero metrics are included in the list 802, solving the problem of sparseness associated with m×m array representations of an ontology. Each entry in the list represents a single arc of an ontology. The entries are sorted, in FIG. 8, in ascending order with respect to the value stored in the first cell of each entry, as readily seen by the values in the first cells of the entries in FIG. 8. This organization facilitates access to those entries associated with a particular term or phrase to which an arc is directed in the graphical representation of the ontology. In certain embodiments, the entries may additionally be sorted with respect to the value stored in the second cell of each entry, and in yet additional embodiments, the list-representation of an ontology may be accompanied by one or more tables of references, or indexes, to facilitate rapid access to particular entries of the ontology.

In practice, even the list representation of an ontology, shown in FIG. 8, may be somewhat of an abstraction. In one embodiment of the present invention, the ontology includes the raw data employed to compute the co-occurrence metric, for each entry, rather than the computed co-occurrence metric. FIG. 9 shows a portion of an ontology representation used in one embodiment of the present invention. The ontology is represented as a list 902, similar to the list representation illustrated in FIG. 8. However, instead of including a single, computed co-occurrence metric, as in FIG. 8, each entry in the list of FIG. 9 includes, in one embodiment of the present invention, three numeric values 904-906 that encode the number of occurrences of the word or phrase represented by the value stored in the first element 908 of the entry, within the same information item, or within a subunit or subsection of the information item, as the word or phrase represented by the value stored in the second cell 910 of the entry in a large number of collected and processed information items corresponding to the information category for which the ontology is prepared.

Figure 10:
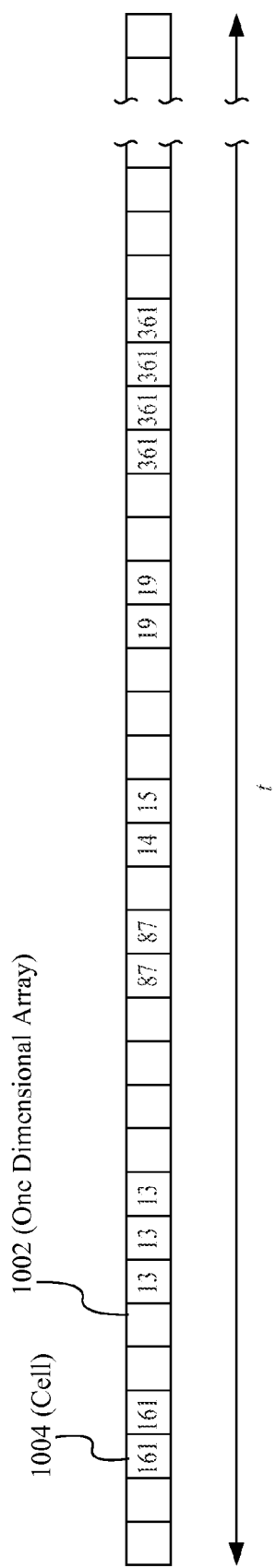
FIG. 10 illustrates one implementation of a transcript, according to one embodiment of the present invention.
Figure 11:
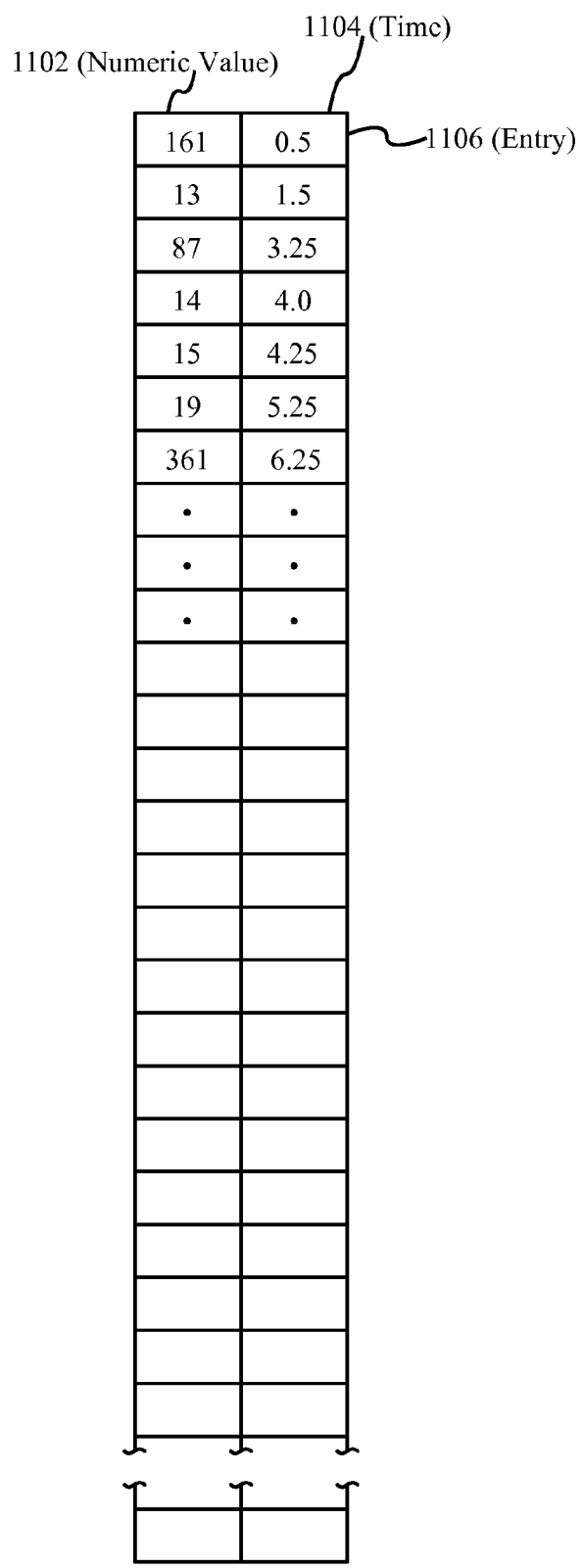
FIG. 11 illustrates an alternative representation of a transcript, according to one embodiment of the present invention.

In the current discussion, content items are video files that include audio tracks. In one embodiment of the present invention, searching is carried out by the CSS system exclusively on the audio track of a video file, using terms and phrases input by a user to find those terms or phrases, or related terms and phrases, which occur at points in time in the audio track. Thus, portions of the audio track can be identified as being related to search terms and of particular interest to a user. Those portions of the audio track can, in turn, be related to the video images that are displayed in the interval of time in which the portions of the audio track are rendered, when the video file is presented to the user by a video-file-rendering application. In these embodiments, a transcript (426 in FIG. 4) is essentially a list of term or phrase occurrences associated with a time, or time interval, when the terms or term phrases occur in the audio track during rendering of the audio track to a user. FIG. 10 illustrates one implementation of a transcript, according to one embodiment of the present invention. In FIG. 10, each cell in a one-dimensional array 1002, such as cell 1004, is either blank, indicating that no word or phrase was recognized during that time interval, or contains a numeric representation of a word or phrase selected from the vocabulary associated with the category of the content item from which the transcript is prepared. In this embodiment of a transcript, each cell represents a small, fixed interval of time, so that the one-dimensional array 1002 represents a time line for rendering of the audio track of a video file. FIG. 11 illustrates an alternative representation of a transcript, according to one embodiment of the present invention. In FIG. 11, the transcript is represented as a list, or two-dimensional array, each entry, or row, of which contains a numeric value indicating a word or phrase from a vocabulary, such as numeric value 1102, and an associated time at which the word or phrase occurs in the audio track, such as time 1104, both within entry 1106. Many alternative representations of transcripts are possible.

Figure 12:
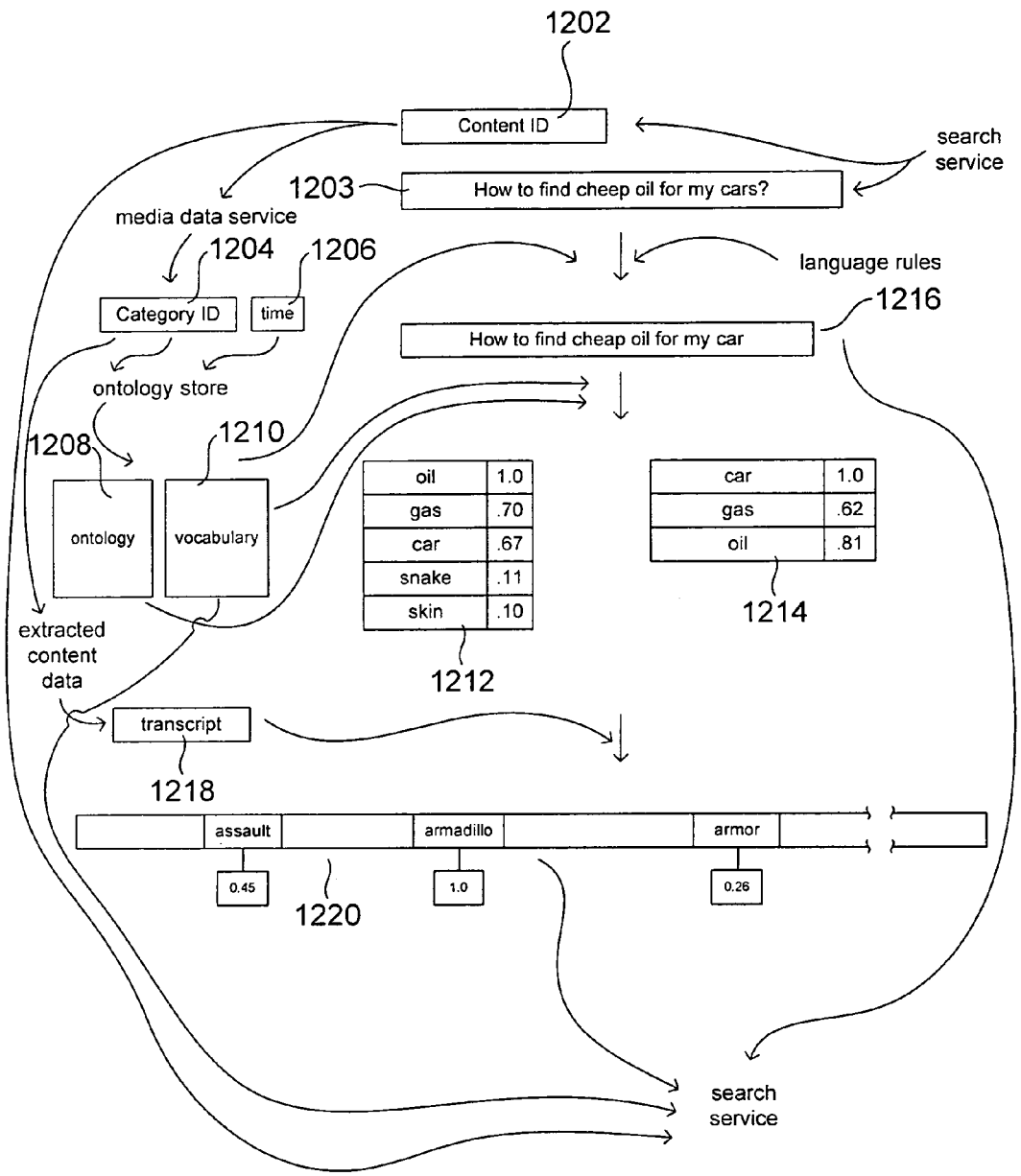
FIG. 12 illustrates operation of the concept-service component (408 in FIG. 4) of a CSS that represents one embodiment of the present invention.

FIG. 12 illustrates operation of the CS component (408 in FIG. 4) of a CSS that represents one embodiment of the present invention. The CS component receives a content ID 1202 and a search query 1203 from the search-service component (404 in FIG. 4) of the CSS that represents one embodiment of the present invention. The content ID is generally a numerical identifier, or alphanumeric string, that uniquely identifies a particular content item. A particular content item is, in one embodiment of the present invention, a logical content item that may encapsulate a number of different, discrete content encodings, including, for example, multiple different MPEG encodings of a particular video, each at a different resolution, as specified by a bandwidth, or number of kilobits per second, of the encoded signal. All of the different encodings are alternative representations of the video, and are therefore identified by a single, common content ID. The CS component uses the content ID 1202 to access the media-data-service component (418 in FIG. 4) to obtain a category ID 1204 for the content item and a date/time 1206 for 1206 for the content item. The CS component additionally accesses the ontology store (414 in FIG. 4) and, in certain embodiments, the language-model store (436 in FIG. 4) in order to obtain an ontology 1208 and a vocabulary 1210 appropriate for the content item. Using the ontology and vocabulary 1208 and 1210, and using various language-processing rules and routines, the CS component then processes the received search query 1203 to generate one or more term-or-phrase lists 1212 and 1214. First, the search query is corrected for spelling mistakes and normalized to produce a modified search term or phrase 1216, employing language routines that are also employed by the ontology builder to construct ontologies from collected information. The modified search query 1216 is then processed to extract those words that occur in the vocabulary for the category to which the content item identified by the content ID 1202 belongs. The category is identified by the category ID 1204 obtained from the media-data-service component. Each list 1212 and 1214 comprises a search term or phrase and additional, related search terms and phrases, as obtained from the ontology 1208. Each term or phrase in the list is associated with a co-occurrence-metric value extracted from the ontology. In the example shown in FIG. 12, the terms "gas," "car," "snake," and "skin" are found, in the ontology, to be related to the search term "oil," and are therefore included in list 1212 for the search term "oil." Similarly, the list 1214 contains the search term "car" and the additional, related terms "gas" and "oil." The related terms and phrases are obtained, from the ontology, from those entries in which a search-query term or phrase occurs as the first value in the ontology entries (see FIGS. 8 and 9). Once the lists have been prepared, the CS component then accesses the extracted-content-data component (416 in FIG. 4) to obtain a transcript for the content item 1218. The CS component then uses the lists 1212 and 1214 to assign co-occurrence metrics to those terms and phrases of the transcript 1218 that occur in the vocabulary of the category to which the content item belongs, to produce a scored transcript 1220. The CS service then, in one embodiment of the present invention, returns the scored transcript and content ID, and, optionally, the modified search phrase 1216 and a reference to the vocabulary, to the search-service component (404 in FIG. 4) of the CSS system. The search-service component then further processes the scored transcript to render search results to a user.

FIG. 13 illustrates one embodiment of a scored transcript, according to one embodiment of the present invention. The scored transcript is a list of tuples, each tuple of which is represented in FIG. 13 by a row, such as row 1304. Each tuple, such as tuple 1304, includes the numeric representation of a word or phrase, an indication of the elapsed time at which the word or phrase occurs in the audio transcript, and a score computed for the word or phrase. In general, the score is a function of the co-occurrence metric or metrics obtained from the ontology used to score the transcript. In one embodiment of the present invention, for example, the score is simply the co-occurrence metric obtained from the ontology, unless the term or phrase for which the score is computed occurs in multiple lists, such as in both of lists 1212 and 1214 in the example of FIG. 12, in which case the score may be computed as the average, or as a weighted average, of the co-occurrence metrics associated with the term in any of the lists in which the term or phrase occurs.

Figure 14:
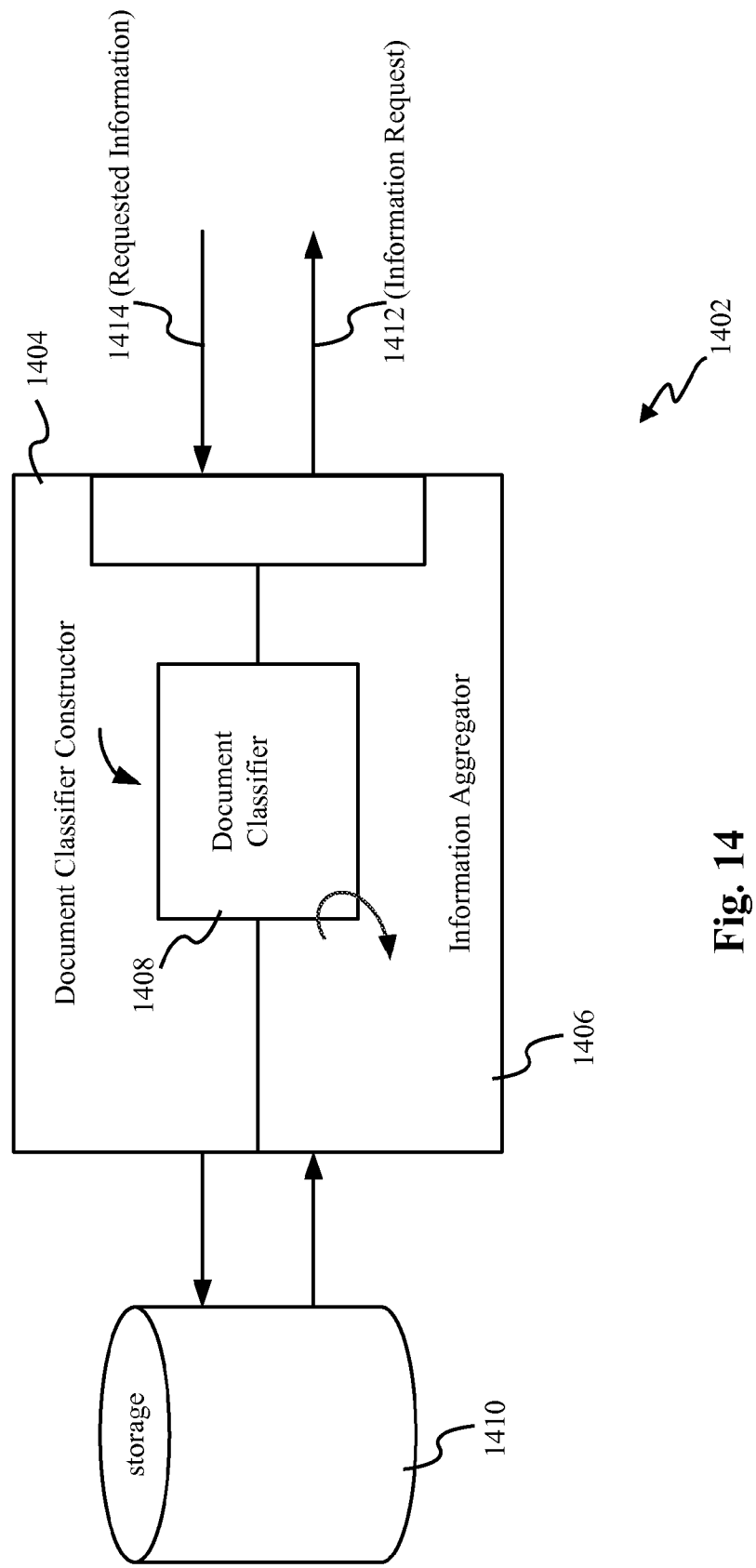
FIG. 14 provides a high-level block diagram of the information aggregator and classification component of the CSS system that represents one embodiment of the present invention.

FIG. 14 provides a high-level block diagram of the information aggregator and classification component of the CSS system that represents one embodiment of the present invention. The information aggregator and classifier (440 in FIG. 4) is responsible for collecting information from various information sources, including the Internet, which is subsequently used by the language-model builder (444 in FIG. 4) to construct category-specific language models (434 in FIG. 4) that are used by the content processor (432 in FIG. 4) to prepare transcripts (426 in FIG. 4), and which is used by the ontology builder (446 in FIG. 4) to construct category-specific ontologies (422 in FIG. 4) used by the CS component (408 in FIG. 4) to prepare scored transcripts, as discussed above. The IAC component 1402 includes two main subcomponents: (1) a document-classifier-constructor subcomponent 1404 and an information-aggregator subcomponent 1406. The document-classifier-constructor subcomponent constructs, or trains, a document classifier 1408 which is used by the information-aggregator subcomponent to classify documents obtained from information sources, by assigning each document to a category, and to then aggregate information collected from the documents on a category-by-category basis. As shown in FIG. 4, the IAC component uses a categorized-information-storage component (442 in FIG. 4) 1410 for temporary storage of documents and for final storage of processed-document packages that are used by the ontology builder and language-model builder. The IAC component requests information 1412, and receives requested information 1414, from the Internet and potentially from other information sources, including online databases, Really Simple Syndication ("RSS") feeds, and additional types of electronically-encoded-information sources. Prior to describing the information-aggregator subcomponent and the document-classifier-constructor subcomponent of the IAC component, various modules and functionality employed by these subcomponents are first described.

Figure 15:
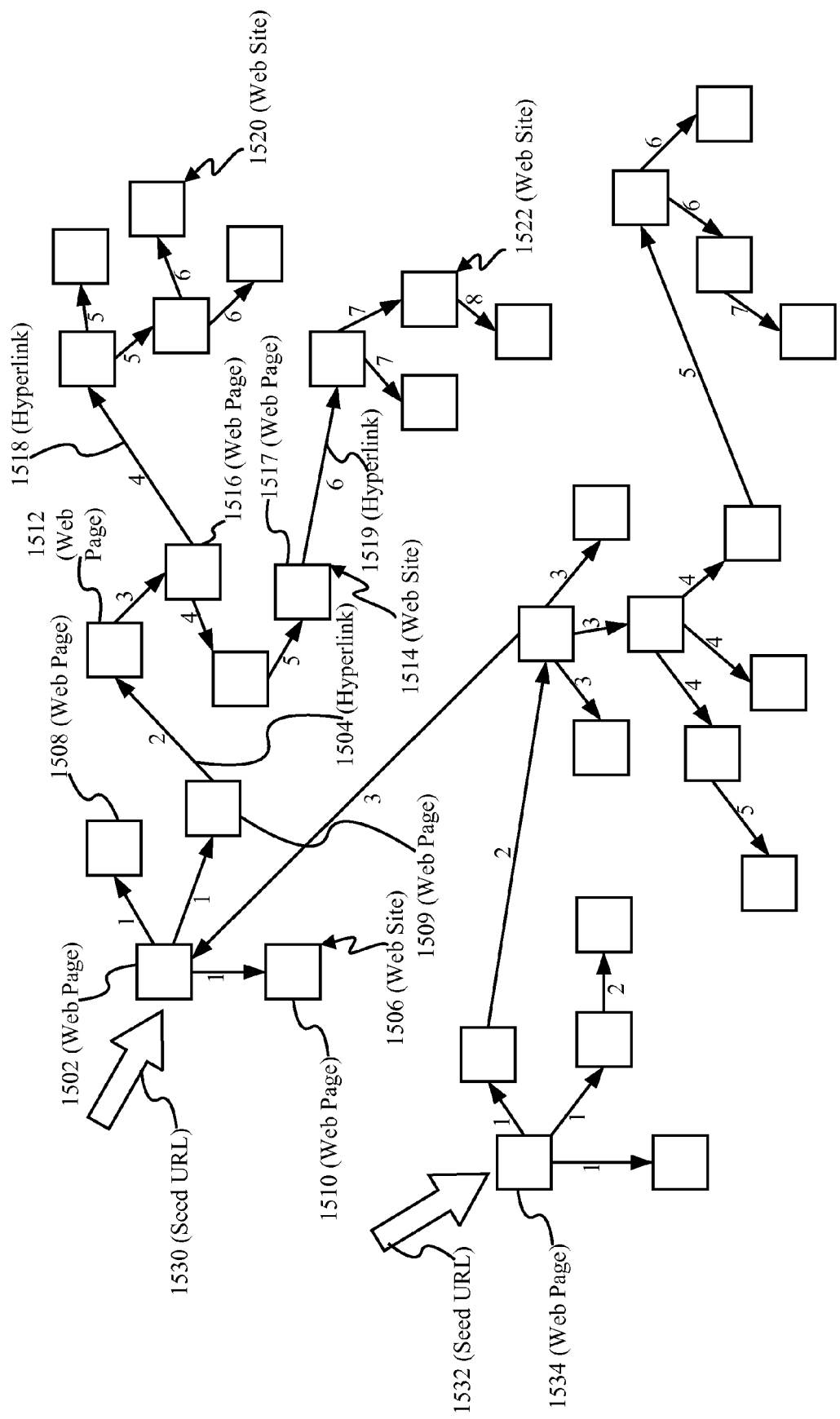
FIG. 15 illustrates operation of a web crawler.

FIG. 15 illustrates operation of a web crawler. As is well known to those familiar with the Internet and Internet browsing, web pages, such as web page 1502, encoded as hypertext-markup ("HTML") files, are organized into a complex graph, via hyperlinks included in web pages that reference other web pages. Currently, a user accessing the Internet through a commonly available web browser can potentially access many hundreds of millions or billions of different web pages. Normally, the user searches for a topic of interest using a search engine which returns a list of universal resource locators ("URLs") for web pages determined by the search engine to be related to the user's topic of interest, and then begins accessing web pages identified by the initial list of URLs, often navigating from initially viewed pages to additional pages through hyperlinks included within displayed web pages.

FIG. 15 shows a very small portion of the Internet, with hyperlink that link web pages shown as arrows, such as arrow 1504, and the web pages shown as square-shaped nodes of the graph. A first web site 1506 may include web pages 1502 and 1508-1510, with web pages 1508-1510 linked from the home web page 1502 of the web site. Web page 1509 of the web site 1506 may contain a hyperlink 1504 to the home web page 1512 of a second web site 1514. Web pages within this second web site 1516-1517 may, in turn, contain hyperlinks 1518 and 1519, respectively, to additional web sites 1520 and 1522. The graph of the Internet would be far too complex to represent any kind of visual display, with many web sites containing hundreds of web pages and hundreds to thousands of internal hyperlinks and hyperlinks to external web sites.

A web crawler is an automated software program that is designed to access the Internet, starting at a number of web pages specified by a number of seed URLs, and to then comprehensively navigate outwards from the URLs to collect all web pages that can be accessed by traversing hyperlinks from the initial, seed URLs up to some linkage depth. For example, in FIG. 15, a web crawler may start at the two web pages 1502 and 1534 addressed by two seed URLs 1530 and 1532, respectively. In FIG. 15, the various hyperlinks, such as hyperlink 1504, are labeled with the depth of the hyperlink with respect to a search beginning from the two web pages 1502 and 1534 addressed by two seed URLs 1530 and 1532. Thus, for example, web page 1508 is found at a depth of 1, being directly linked from the initial web page 1502 of the crawl, while web page 1517 occurs at a depth of 5 from the initial seed URLs 1530 and 1532. Because of the complexity of the graph, many web pages, such as web-page 1502, may be visited multiple times during a crawl. Because of the complexity, density, and magnitude of the web-page structure of the Internet, the number of web pages encompassed in each, successive crawl-depth may increase hyper-exponentially. Web crawlers can be designed to carry out various types of directed searches, as specified by additional parameters. In general, web crawlers deposit the HTML files corresponding to accessed web pages into large data files or databases. Alternatively, web crawlers may begin searching at randomly-selected points in web space, when no seed URLs are provided.

Figure 16A:
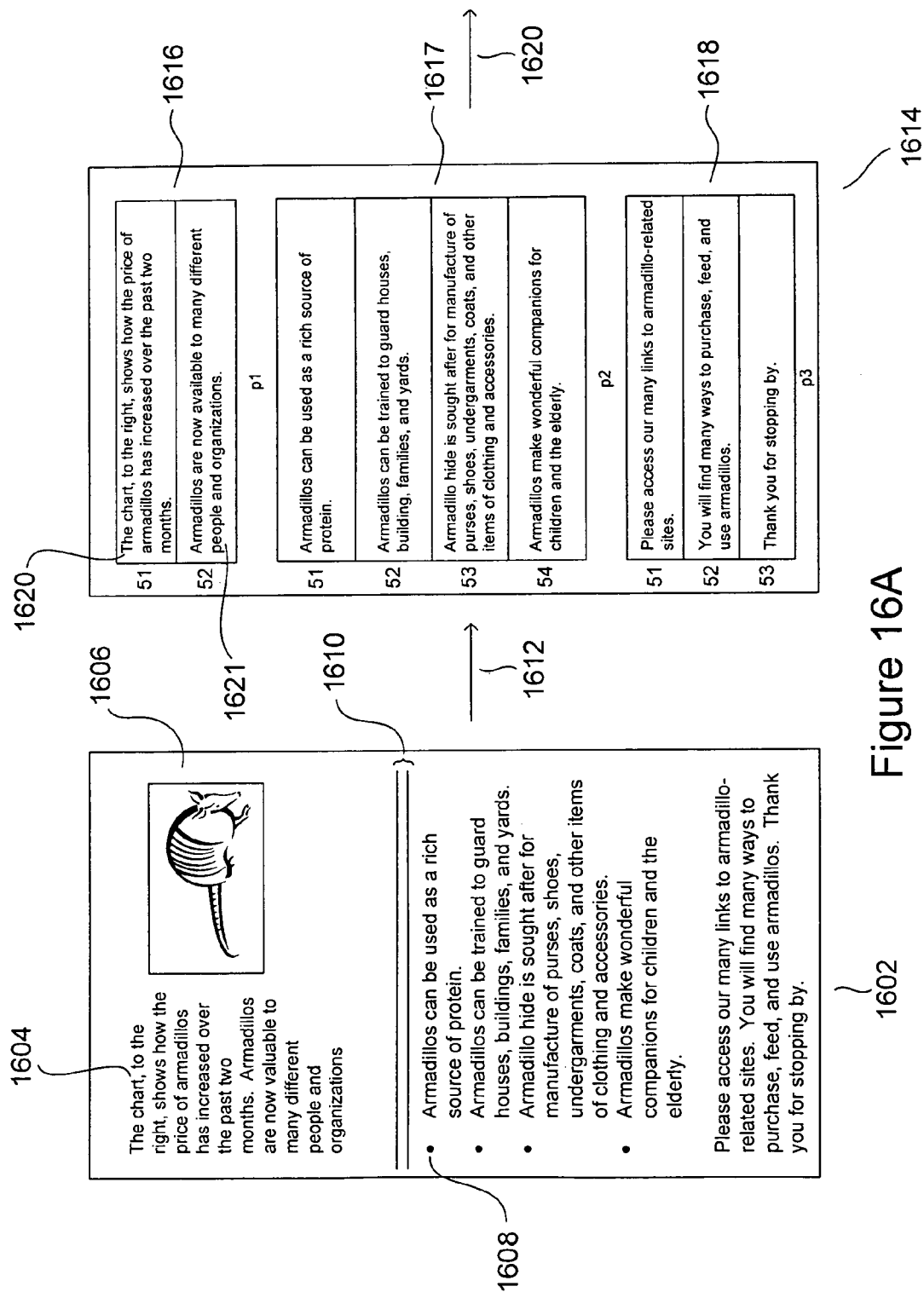

Embodiments of the present invention employ a filtering and normalizing method for processing HTML files and other documents obtained from the Internet into compact, linguistically normalized documents that can be used to build language models and ontologies. FIGS. 16A-B illustrate a document filtering and normalization method employed in one embodiment of the present invention. In FIG. 16A, a rendering of an HTML-encoded web page 1602 is shown. The web page includes text 1604, a jpg image 1606, and various non-text graphics and symbols, such as bullets 1608 and horizontal lines 1610. The web page 1602 shown in FIG. 16A is a very simple web page. Nowadays, many web pages contain a variety of different types of features, controls, images, and non-text items, and may additionally include executable scripts and routines.

In an initial series of steps, the filter that represents one embodiment of the present invention transforms 1612 the HTML encoding of a web page into a much simpler, paragraph-and-sentence delimited text file 1614. As can be seen in FIG. 16A, all non-text items have been removed from the initial HTML file to produce the paragraph-and-sentence delimited text file 1614, and the remaining text has been blocked into paragraphs 1616-1618, with each paragraph, in turn, blocked into sentences, such as sentences 1620-1621 of paragraph 1616. In FIG. 16A, the paragraphs are labeled "P1," "P2," and "P3," and the sentences in each paragraph are labeled "S1," "S2" . . . . Next, as shown in FIG. 16B, the paragraph-and-sentence delimited text file is then transformed 1620 by a series of language routines to identify the parts of speech of all the words and to remove words that are not nouns to produce a noun-only text document 1630. The paragraph and sentence structure of the paragraph-and-sentence delimited text file (1614 in FIG. 16A) is maintained in the noun-only text document. Next, the noun-only text document 1630 is transformed 1632 into a normalized document 1634 by a series of filtering and linguistic normalization steps. A large list of words deemed to be of no use to the language-model builder and ontology builder is used to remove occurrences of those words from the noun-only text document 1630. This list of words that should be removed can be prepared according to various statistical and other considerations. For example, words known to occur with relatively high frequencies across numerous categories of content may not, in general, provide great discrimination of those portions of media content relevant to a user. In addition, statistics can be collected for user queries, and words and phrases that are not generally encountered in search queries directed to media content of a particular query may be removed from noun-only text documents collected to build ontologies for that category. In addition, linguistic routines are employed to normalize each noun by, for example, changing all upper-case characters to lower case, changing any plural noun to its singular form, and replacing derived nouns with the roots of those derived nouns, in certain cases. As can be seen in FIG. 16B, the normalized text document is far more structured, and simpler, than the initial HTML file, rendered as web page 1602 in FIG. 16A. The normalized text file 1634 contains exactly that information useful to the language-model builder and ontology builder in described embodiments of the present invention.

Indexers can be applied to normalized text documents to generate additional, useful information. FIG. 17 shows a term vector generated from the normalized text document shown in FIG. 16B. In FIG. 17, the normalized text document 1702 is shown above a two-dimensional array 1704 representation of a term vector. The term vector includes one entry for each unique term that occurs in the normalized text document, such as the entry 1706 for the term "chart." Each entry in the term vector includes either the symbolic representation of a term, such as the symbol string "chart," or an integer value for the term, selected from a vocabulary, as discussed above. Each entry also includes the number of occurrences of the term within the document.

Figure 18:
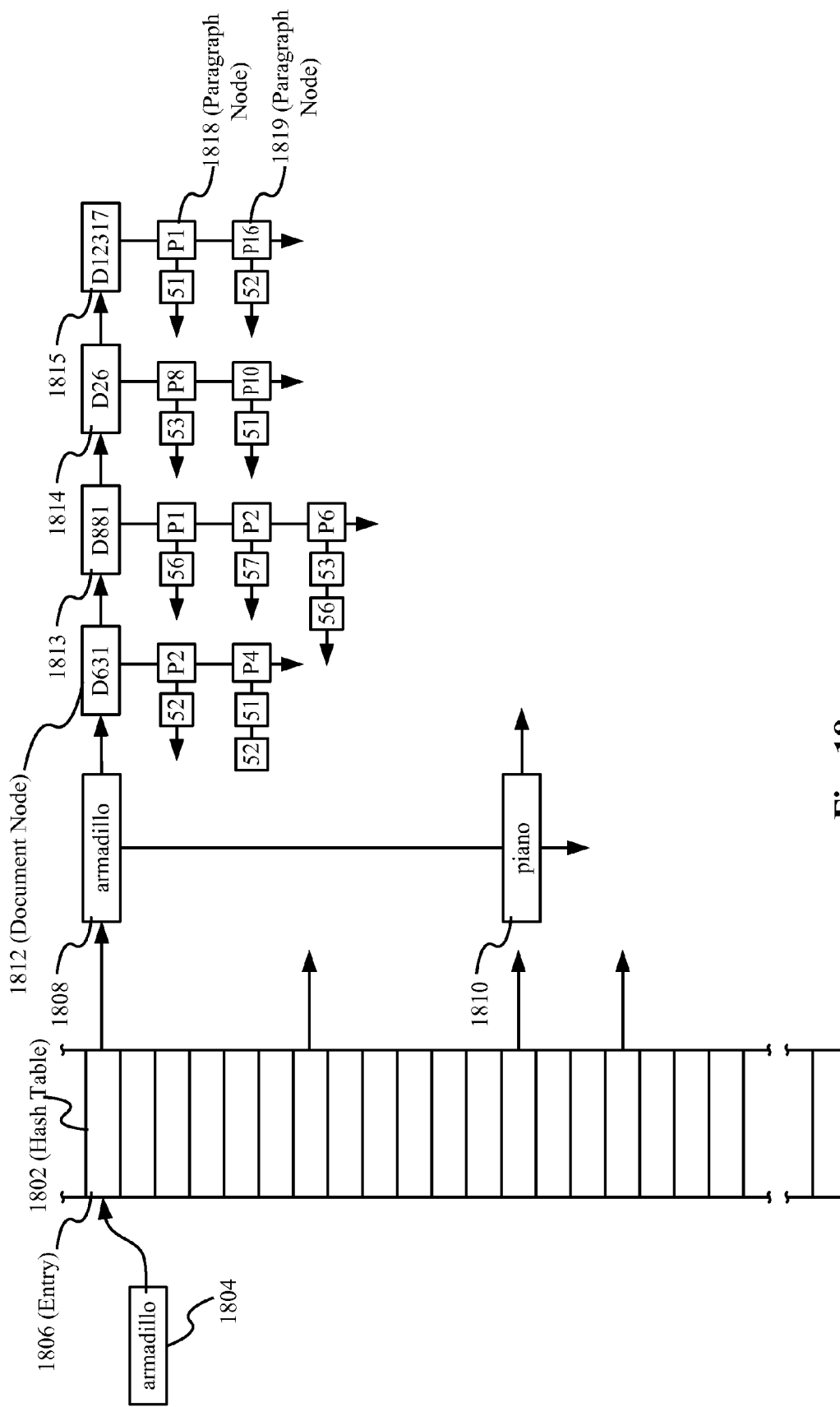
FIG. 18 shows the logical structure of one type of inverted-keyword index.

Another compilation of information that is compiled and provided by certain indexers from a normalized text document is an inverted-keyword index. FIG. 18 shows the logical structure of one type of inverted-key-word index. The inverted-keyword index may contain information about the frequencies of occurrence of terms within one normalized text document or in a collection of normalized text documents. FIG. 18 shows an inverted-keyword index for a collection of text documents. The inverted-keyword index includes a hash table 1802 that can be used to quickly identify compiled frequency-of-occurrence information for each term encountered in the collection of documents. A hash value 1804 can be computed from the word "armadillo," or the numeric value for the word "armadillo" selected from a vocabulary, can be used to compute a numeric value, or reference to, an entry in the hash table 1806. That entry contains a pointer to one, or a list of, frequency-of-occurrence information for the term or terms that hash to the particular hash-table entry, or bin. In the example shown in FIG. 18, hash-table entry 1806 corresponds to the words "armadillo" 1808 and the word "piano" 1810. The first term node 1808 referenced from the hash table, corresponding to the term "armadillo," in turn references a list of document nodes 1812-1815 that include the term "armadillo."Each document node, in turn, references a list of paragraphs, such as paragraph nodes 1818-1819 associated with document 1815, representing all the paragraphs within a given document in which the term occurs. The paragraph nodes may then, in turn, reference sentence nodes or linked lists of sentence nodes, which indicate those sentences in the paragraph in which the term occurs. Each node in the hierarchical tree of nodes emanating from the term node 1808, and including the term node, may include an integer value representing the total number of occurrences of the term at each level in the hierarchy. For example, the term node 1808 may include an integer value for the number of occurrences of the term "armadillo" in the entire collection of documents. The document node 1812 may contain an integer value indicating the number of occurrences of the term "armadillo" in the document represented by the document node.

Figure 19:
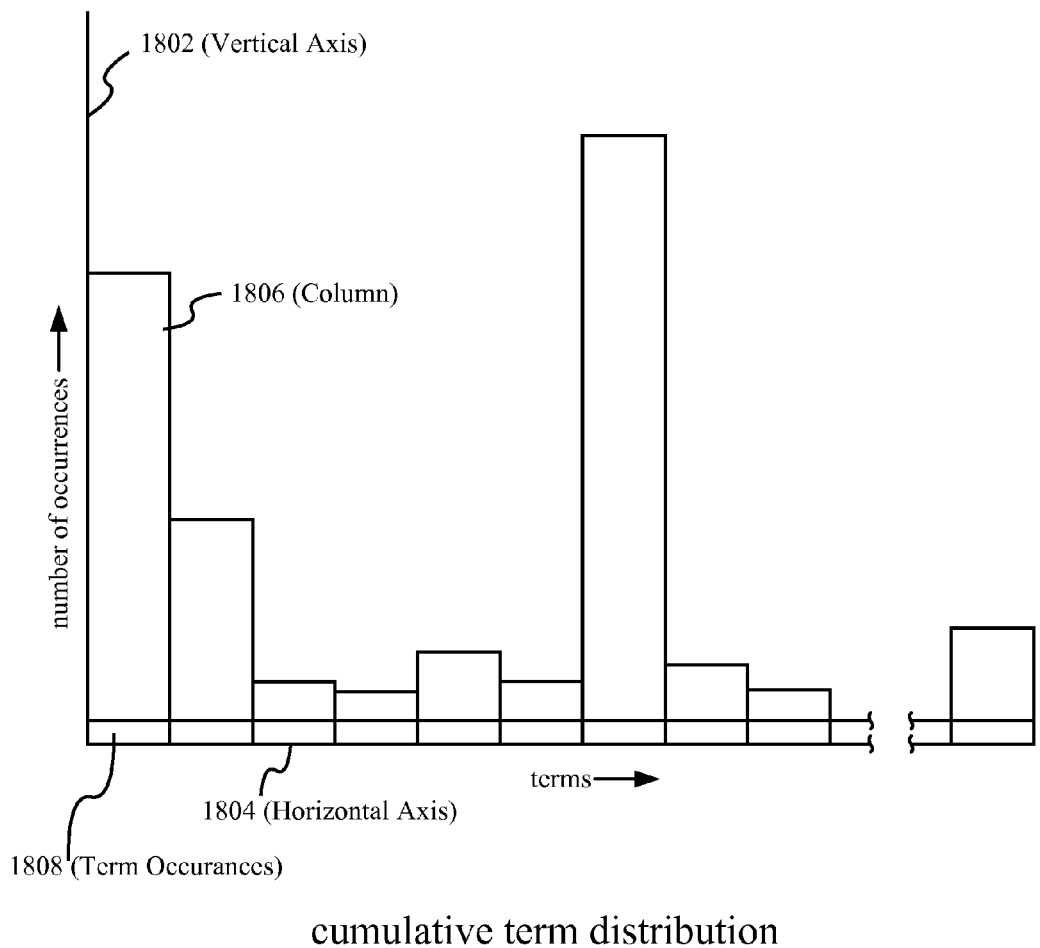
FIG. 19 illustrates a cumulative term distribution according to one embodiment of the present invention.

There are many different types of inverted key words indexes. The inverted-keyword index in FIG. 18 is intended to show the types of information that may be contained in an inverted-keyword index. In general, while a hash table provides fast lookup, the data stored in hierarchical node trees in FIG. 19 are often stored as fields within bit strings, or in blocks of memory, rather than as a tree of nodes, to facilitate more rapid retrieval of information than can be obtained by traversing complicated trees. It should be noted that, when an indexer prepares an inverted-keyword index for each normalized text document, the inverted-keyword indexes for all of the text documents in a collection of text documents can be relatively straightforwardly merged by conceptually appending document-node-headed trees to the list of documents emanating from a term node. Inverted-keyword indexes can be used, in certain embodiments of the present invention, but in many embodiments of the present invention, inverted-keyword indexes are not used.

As discussed with reference to FIG. 17, above, an indexer may prepare a term vector for each normalized text document. A large number of term vectors for a collection of related, normalized text documents, can be aggregated by adding the numbers of occurrences of each term in all of the normalized text documents of the collection to produce a cumulative number of occurrences for each term in the term vector. The cumulative number of occurrences of all of the terms constitutes a cumulative term distribution for the collection of related, normalized text documents. FIG. 19 illustrates a cumulative term distribution according to one embodiment of the present invention. The cumulative term distribution is essentially a histogram, with the number of occurrences plotted with respect to a vertical axis 1802 for terms plotted along a horizontal axis 1804. The height of a particular column, such as column 1806, represents the number of occurrences for the term 1808 below the column. A cumulative term distribution can be computationally represented as a two-dimensional array, with entries equivalent to those in the term vector, as discussed above with reference to FIG. 17.

Figure 20:
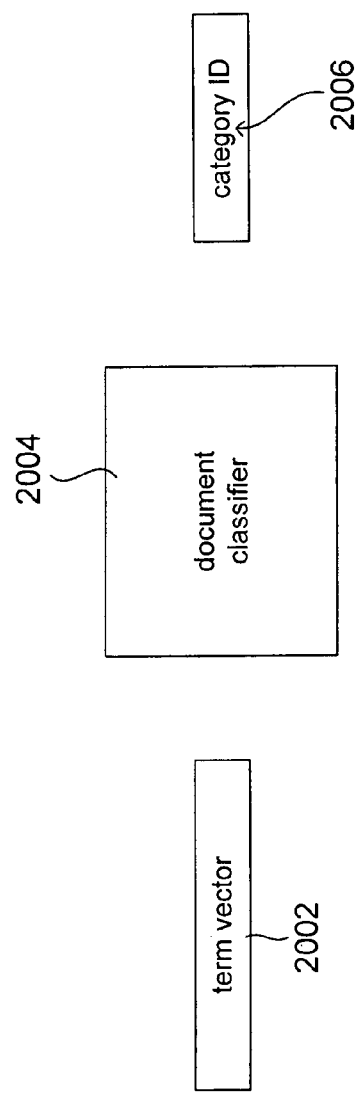
FIG. 20 illustrates the function of the document-classifier subcomponent of the IAC component.

A document-classifier subcomponent of the IAC component (1408 in FIG. 14) is next described. FIG. 20 illustrates the function of the document-classifier subcomponent of the IAC component. A term vector 2002 is input to the document-classifier subcomponent 2004, and the document-classifier subcomponent applies various rules, learned probabilities, or other internally stored information in order to produce a category ID 2006 that is likely to represent the category of the document associated with the term vector. In other words, following construction of a term vector for a normalized text document, as discussed above with reference to FIG. 17, the term vector associated with the normalized text document can be input to a document-classifier subcomponent in order to determine the category ID of the category to which the document belongs. There are many different types of document classifiers.

In one embodiment of the present invention, a naïve Bayesian document classifier is employed. In the Bayesian approach, one computes the likelihood of a document being a member of a particular category $C_i$ from probabilities that a document of category $C_i$ will generate various measurable quantities $F_1, F_2, \ldots, F_n$ estimated from previously observed data. Using the occurrence values from elements of a term vector, $T_1, T_2, \ldots, T_n$, as the measurable quantities, a naïve Bayesian classifier classifies a document by attempting to find a category $C_i$ for which the probability that the document belongs to category $C_i$, in view of the values of the term vector components $T_1, T_2, \ldots, T_n$, is highest among all categories in a set of categories C. Thus, the naïve Bayesian classifier seeks:

$$C_i = \overset{\text{argmax}}{j} p(C_j | T_1, T_2, \ldots, T_n)$$

In order compute the probabilities, Bayes' theorem is used to compute $p(C_j | T_1, T_2, \ldots, T_n)$ as:

$$\frac{p(C_j) p(T_1, T_2, \ldots, T_n | C_j)}{p(T_1, T_2, \ldots, T_n)}$$

In other words, the probability that the document belongs to category $C_j$ can be computed from the probability of any document belonging to category $C_j$, the probability of observing a given set of term-vector values for a term vector obtained from document belonging to category $C_j$, and the probability of observing the given set of term-vector values. When independence between term occurrence values in a term vector is assumed, the above expression for computing $p(C_j | T_1, T_2, \ldots, T_n)$ can be replaced by the expression:

$$\frac{1}{S} p(C_j) \prod_{k=1}^{n} (T_k | C_j)$$

where S is a scale factor. All of the terms in this expression can be obtained from a collection of cumulative term distributions for a known set of categories.

Figure 21:
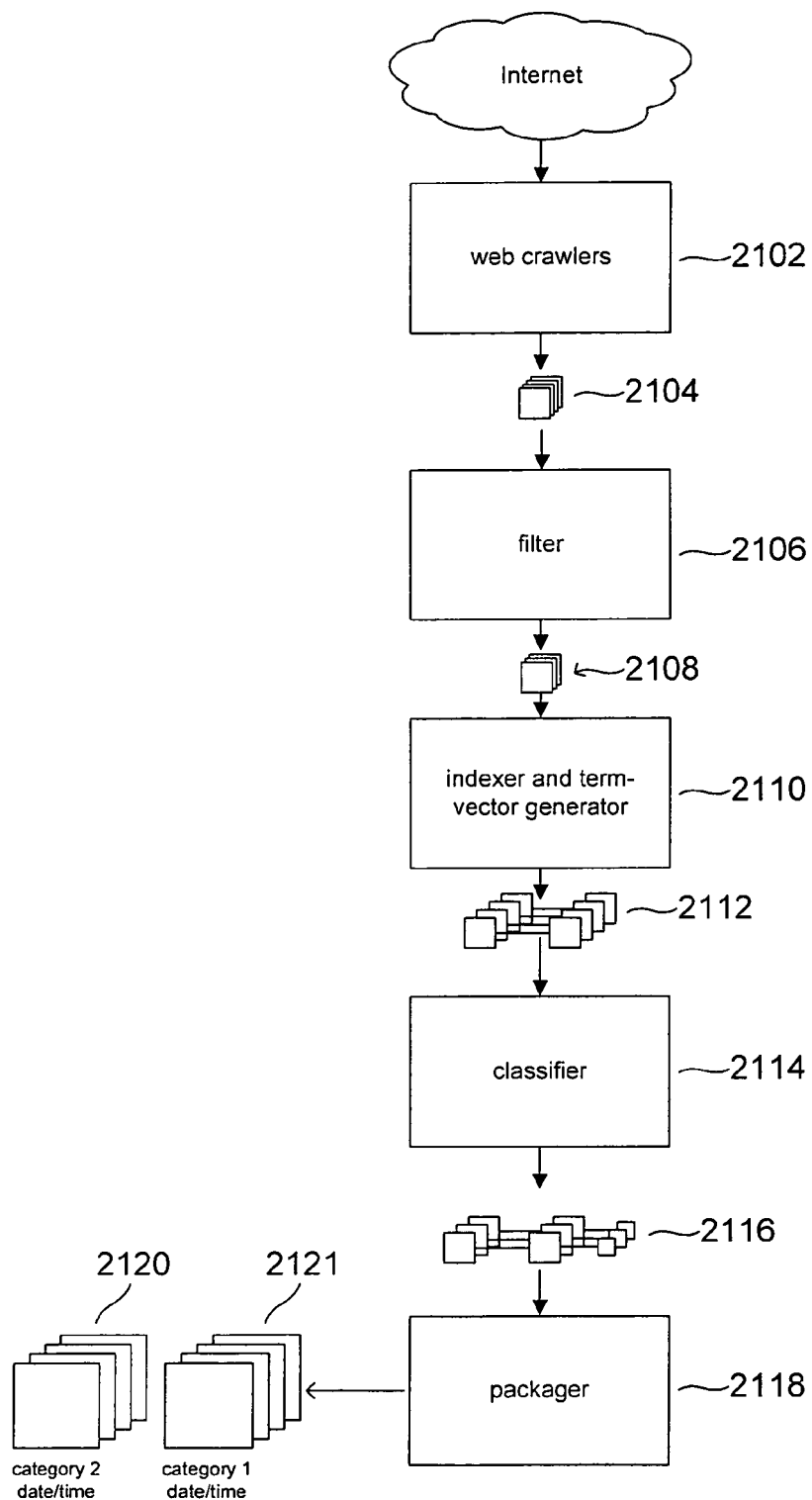
FIG. 21 illustrates operation of the information-aggregator subcomponent of the IAC component.

Having described web crawlers, document filters, indexers and term vectors, the information-aggregator subcomponent (1406 in FIG. 14) of the IAC component can next be described. FIG. 21 illustrates operation of the information-aggregator subcomponent of the IAC component. The information-aggregator subcomponent includes a web crawler 2102 that is directed to crawl the Internet from a set of seed URLs. The seed URLs can be, in turn, obtained from various commercial web directories, by a category-based, random-selection method. The web crawler 2102 returns a large number of web pages 2104, generally encoded as HTML files, which are then filtered, by a filter component 2106, as discussed above with reference to FIGS. 16A-B. The filter subcomponent 2106 produces a collection of normalized text documents 2108 that are input to an indexer and term-vector generator 2110 to produce term vectors for each normalized text document 2112, and, in certain embodiments of the present invention, inverted-keyword indexes. The term vectors are input into a document classifier 2114 to determine the category for each normalized text document, which is then associated with a text document and, in certain embodiments of the present invention, a corresponding inverted-keyword index 2116. The normalized text documents are then input into a packager 2118 that partitions the normalized text documents and associated inverted keyword indexes into date-stamped or date/time-stamped collections of normalized text documents for each of a number of categories 2120-2121. The date-stamped or date/time-stamped collections of normalized text documents are then stored in the categorized information storage component (442 in FIG. 4) for use by the language-model builder and the ontology builder. A vocabulary may be computed for, an associated with, each normalized-text-document package produced by the IAC component. Alternatively, vocabularies can be separately prepared and stored for each category.

Figure 22:
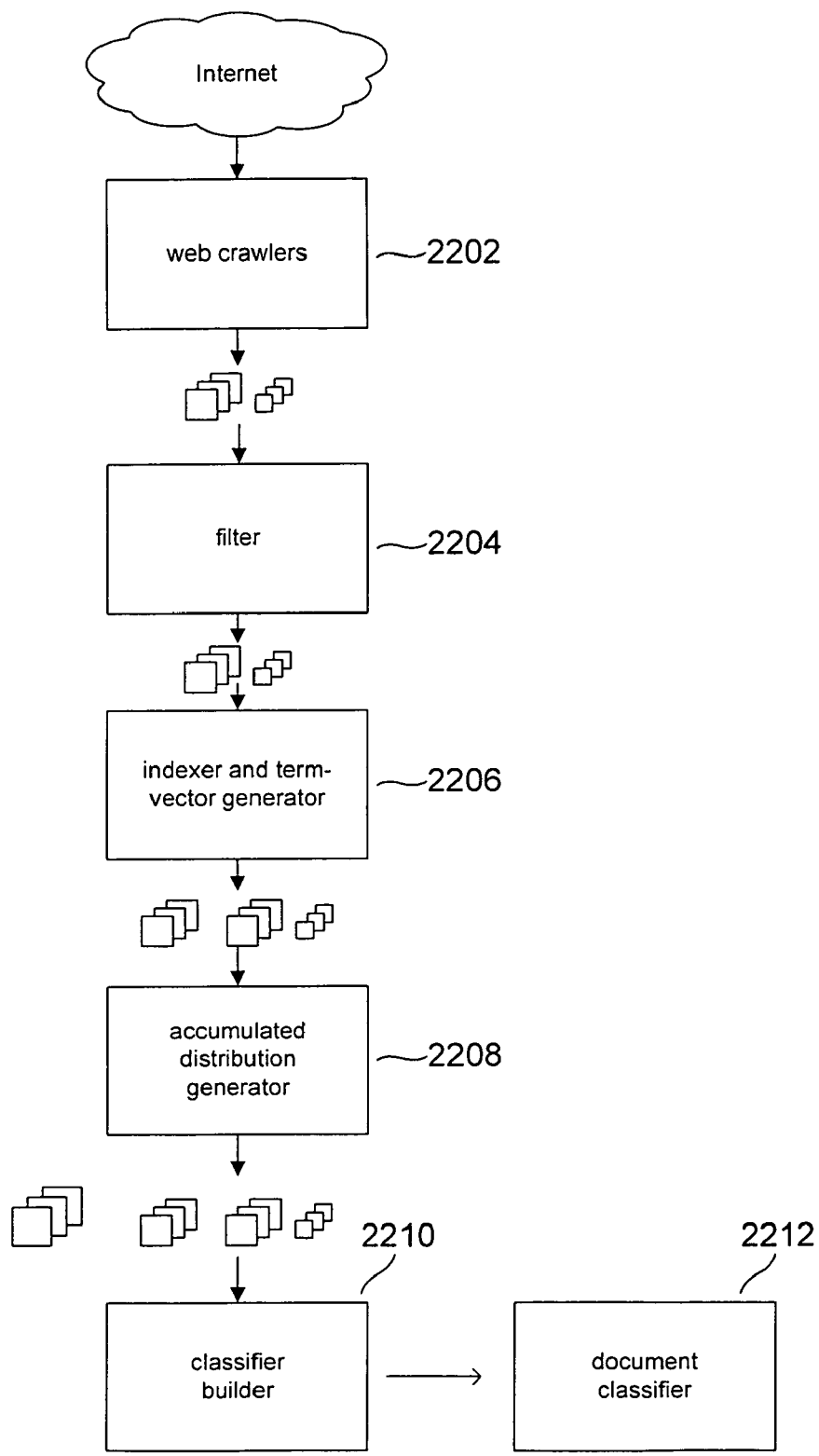
FIG. 22 illustrates operation of the document-classifier-constructor subcomponent of the IAC component.

FIG. 22 illustrates operation of the document-classifier-constructor subcomponent of the IAC component. As can be seen by comparing FIG. 22 to FIG. 21, the document-classifier-constructor subcomponent (1404 in FIG. 14) shares many modules and a common flow with the above-described information-aggregator subcomponent of the IAC component (1406 in FIG. 14). However, rather than collecting information for use by the language-model builder and the ontology builder, the document-classifier-constructor subcomponent collects a relatively small number of specific documents in order to train the document-classifier component to recognize various categories of documents from the information contained in the documents. Unlike the case of the information-aggregator subcomponent, the web crawler 2202 is directed to obtain specific types of documents belonging to specific categories from the Internet and other information sources. This can be done by using a web-page categorizer, such as a web-page categorizer based on the human-compiled dmoz web-page categories, to filter documents collected by the crawler as well as to direct the crawler to documents of the specified categories via seed URLs and via directed navigation. In addition, the category of each web page, or document, is associated with the document during the initial steps of document preparation. The documents are then processed identically to the processing carried out by the information aggregator subcomponent, including applying filtering 2204 and applying an indexer and term-vector generator 2206. However, because the documents are already categorized, a cumulative distribution generator 2208 can be used to compute the cumulative term distributions, such as the cumulative term distribution shown in FIG. 19, for each category of document. The cumulative term distributions, normalized documents, and term vectors associated with the normalized documents, are then furnished to a document-classifier builder 2210, which uses the information to train a document-classifier subcomponent 2212 to recognize documents of each of the categories. In one embodiment of the invention, the document-classifier component is a naïve Bayesian classifier, which computes various probabilities, as discussed above, in order to compute, from a given term vector, the most likely category to which the document form which the term vector was generated belongs.

Figure 23:
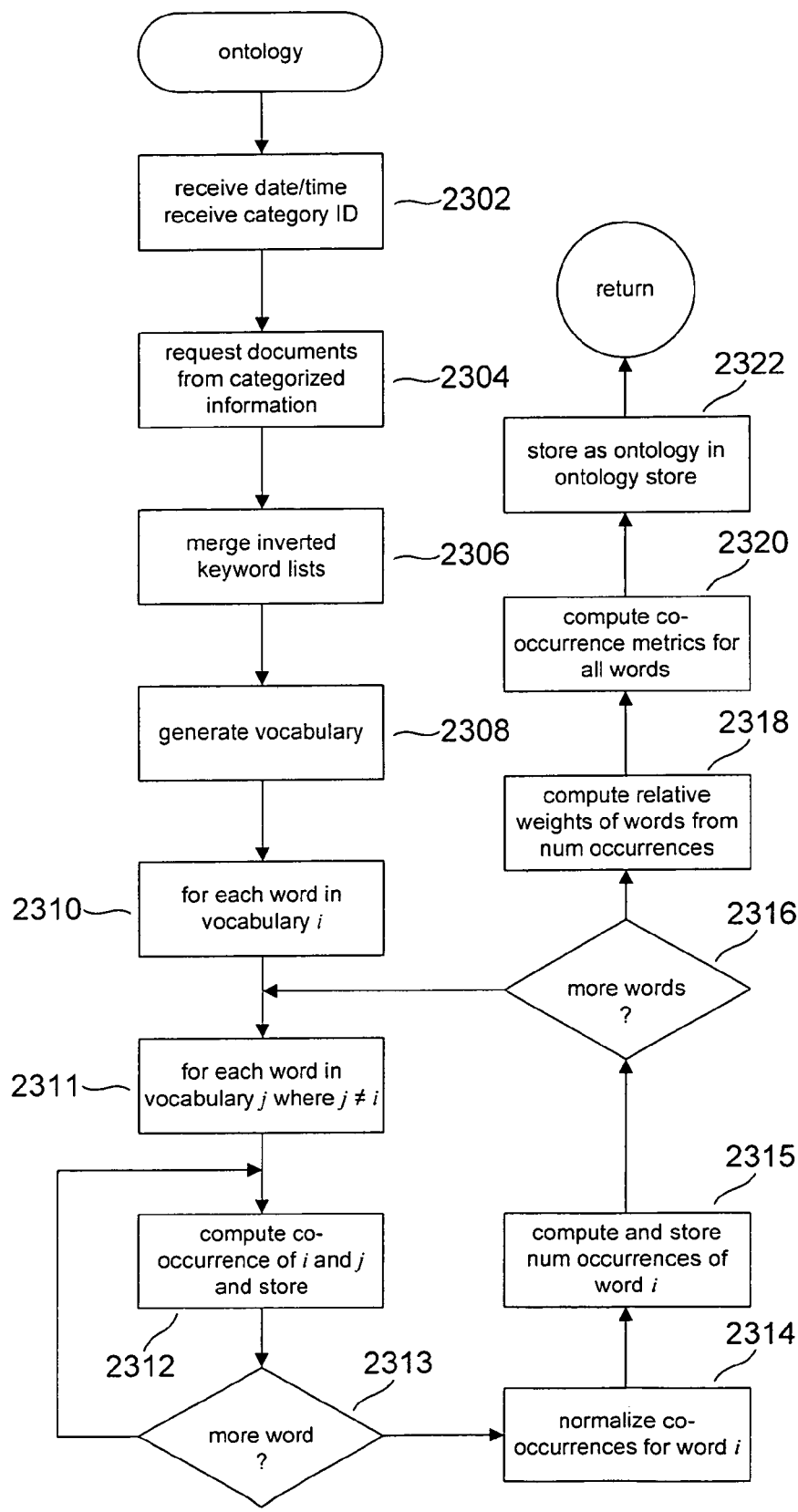
FIG. 23 provides a control-flow diagram for the ontology-builder component of a CSS system.

FIG. 23 provides a control-flow diagram for the ontology-builder component of a CSS system. In step 2303, the ontology-builder component receives a date or date/time, or a range of dates or date/times, as well as a category IL), that specify the range of dates or date/times and a category for which an ontology is to be built. Next, in step 2304, the ontology-builder component requests a collection of normalized documents, with, in certain embodiments of the present invention, associated inverted-keyword indexes, from the categorized-information-storage component (442 in FIG. 4), for the specified dates, range of dates, date/times, or range of date/times and for the specified category. Then, in step 2306, the ontology-builder component merges the inverted-keyword indexes for the documents, in those embodiments of the present invention that employ inverted-keyword indexes, and optionally generates a vocabulary for the documents, in step 2308, in the case that the vocabulary has not already been generated. Next, in an outer for-loop of steps 2310-2316, the ontology-builder component considers each word i in the vocabulary. For each word i, the ontology-builder component computes the co-occurrence frequencies for the currently considered word i and each of the other words in the vocabulary j, where i≠j, from the vocabulary in the inner for-loop of steps 2311-2313. This corresponds to a row in the m×m matrix representation of an ontology, discussed above. In one embodiment of the present invention, three co-occurrence frequencies are computed for each ordered pair of terms (i,j): (1) the co-occurrence frequency in sentences; (2) the co-occurrence frequency in paragraphs; and (3) the co-occurrence frequency in sentences. Then, the co-occurrence frequencies are normalized for the currently considered term i, and the total number of occurrences of the term i are computed and stored, if not already included in the merged inverted-keyword index in certain embodiments of the present invention. In step 2318, each word in the vocabulary is assigned a weight, depending on the relative number of total occurrences of the term i with respect to the total numbers of occurrences of all terms in the vocabulary. The weight for term i is inversely related to the relative frequency of occurrence of term i, so that commonly occurring terms have lower weights than less-commonly occurring terms. In one embodiment of the present invention, the weight for term i is computed as proportional to $$\frac{1}{\ln(\text{occurrences}_i)}.$$

Then, in step 2320, co-occurrence metrics are computed for all of the rows of the ontology by applying the computed weight factor, computed in step 2318, to each co-occurrence metric for each word. Finally, in step 2322, the ontology-builder component stores the ontology in the ontology-store component (422 in FIG. 4) of the CSS system.

Although the present invention has been described in terms of particular embodiments, it is not intended that the invention be limited to these embodiments. Modifications within the spirit of the invention will be apparent to those skilled in the art. For example, the IAC component of a CSS system can be implemented in any number of different programming languages for execution on any number of different operating systems running on different hardware platforms within many different types of CSS systems. Implementations of the IAC component may vary according to variations in familiar programming parameters and characteristics, including control structures, data structures, modular organization, and other familiar parameters and characteristics. Co-occurrence metrics and other numeric values may have different ranges and representations, in alternative embodiments. The IAC component may run periodically or continuously to prepare normalized text-document packages for periodic or continuous production of language models and ontologies. In alternative embodiments of the present invention, categories may be discovered by discovered by unsupervised document classification.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A computer-based information-aggregation-and-classification system comprising:
a document-classifier;
a document-classifier-constructor subcomponent that uses a collection of categorized and processed documents to construct the document-classifier; and
an information-aggregator subcomponent that:
obtains uncategorized documents from electronic information sources;
filters the uncategorized documents to produce a set of normalized text documents by, for each uncategorized document:
removing non-text items and symbols from the uncategorized document to produce a text document having text;
parsing the text to organize the text of the text document into paragraphs and sentences within paragraphs to produce a paragraph-and-sentence-delimited text document;
applying language-parsing routines to the paragraph-and-sentence-delimited text document to remove non-noun terms from the text to produce a noun-and-noun-phrase-culled text document; and
filtering non-useful terms from normalized terms in the noun-and-noun-phrase-only text document to produce a normalized text document;
applies an indexer to the set of normalized text documents to generate a term vector for each normalized text document in the set of normalized text documents;
inputs the term vector computed for each normalized text document in the set of normalized text documents to assign a category to the normalized text document; and
aggregates normalized text documents of each different category together to produce a normalized-text-document package for each category.

2. The computer-based information-aggregation-and-classification system of claim 1, wherein the document-classifier is a naive Bayesian document classifier.

3. The computer-based information-aggregation-and-classification system of claim 1, wherein the document-classifier-constructor subcomponent:
   obtains documents, to each of which a category is assigned, from electronic information sources;
   filters the documents to produce a second set of normalized text documents;
   applies an indexer to the second set of normalized text documents to generate a term vector for each normalized text document in the second set of normalized text documents;
   computes cumulative term distributions for documents of each category; and
   inputs each normalized text document, together with a term vector computed for the normalized text document and the category assigned to the text document, and the cumulative term distributions for documents of each category to the document classifier to train the document classifier to recognize a category to assign to an input normalized-text-document/term-vector pair.

4. The computer-based information-aggregation-and-classification system of claim 1, wherein the information-aggregator subcomponent uses a web crawler to obtain uncategorized documents from electronic information sources.

5. The computer-based information-aggregation-and-classification system of claim 1, wherein each term vector contains an occurrence count for each term in the normalized text document for which the term vector was computed.

6. The computer-based information-aggregation-and-classification system of claim 1, wherein each normalized-text-document package is date-stamped or date/time-stamped to indicate the date or date and time when the normalized-text-document package was prepared.

7. A method for preparing normalized-text-document packages, the method comprising:
   using a collection of categorized and processed documents to construct a document-classifier;
   obtaining uncategorized documents from electronic information sources;
   filtering the uncategorized documents to produce a set of normalized text documents by, for each uncategorized document:
      removing non-text items and symbols from the uncategorized document to produce a text document having text;
      parsing the text to organize the text of the text document into paragraphs and sentences within paragraphs to produce a paragraph-and-sentence-delimited text document;
      applying language-parsing routines to the paragraph-and-sentence-delimited text document to remove non-noun terms from the text to produce a noun-and-noun-phrase-culled text document; and
      filtering non-useful terms from normalized terms in the noun-and-noun-phrase-only text document to produce a normalized text document;
   applying an indexer to the set of normalized text documents to generate a term vector for each normalized text document in the set of normalized text documents;
   inputting the term vector computed for each normalized text document in the set of normalized text documents to assign a category to the normalized text document; and
   aggregating normalized text documents of each different category together to produce a normalized-text-document package for each category.

8. The method of claim 7, wherein the document-classifier is a naive Bayesian document classifier.

9. The method of claim 7, wherein constructing the document-classifier further includes:
   obtaining documents, to each of which a category is assigned, from electronic information sources;
   filtering the documents to produce a second set of normalized text documents;
   applying an indexer to the second set of normalized text documents to generate a term vector for each normalized text document in the second set of normalized text documents;
   computing cumulative term distributions for documents of each category; and
   inputting each normalized text document, together with a term vector computed for the normalized text document and the category assigned to the text document, and the cumulative term distributions for documents of each category to the document classifier to train the document classifier to recognize a category to assign to an input normalized-text-document/term-vector pair.

10. The method of claim 7, wherein obtaining uncategorized documents from electronic information sources further comprises using a web crawler.

11. The method of claim 7, wherein each term vector contains an occurrence count for each term in the normalized text document for which the term vector was computed.

12. The method of claim 7, wherein each normalized-text-document package is date-stamped or date/time-stamped to indicate the date or date and time when the normalized-text-document package was prepared.

13. A machine-readable medium having instructions stored thereon which, when executed by a processor, cause one or more machines to:
   use a collection of categorized and processed documents to construct a document-classifier;
   obtain uncategorized documents from electronic information sources;
   filter the uncategorized documents to produce a set of normalized text documents by, for each uncategorized document:
      removing non-text items and symbols from the uncategorized document to produce a text document having text;
      parsing the text to organize the text of the text document into paragraphs and sentences within paragraphs to produce a paragraph-and-sentence-delimited text document;
      applying language-parsing routines to the paragraph-and-sentence-delimited text document to remove non-noun terms from the text to produce a noun-and-noun-phrase-culled text document; and
      filtering non-useful terms from normalized terms in the noun-and-noun-phrase-only text document to produce a normalized text document;
   apply an indexer to the set of normalized text documents to generate a term vector for each normalized text document in the set of normalized text documents;
   input the term vector computed for each normalized text document in the set of normalized text documents to assign a category to the normalized text document; and
   aggregate normalized text documents of each different category together to produce a normalized-text-document package for each category.

14. The machine-readable medium of claim 13, wherein the document-classifier is a naive Bayesian document classifier.

15. The machine-readable medium of claim 13, wherein constructing the document-classifier further includes:

obtaining documents, to each of which a category is assigned, from electronic information sources;

filtering the documents to produce a second set of normalized text documents;

applying an indexer to the second set of normalized text documents to generate a term vector for each normalized text document in the second set of normalized text documents;

computing cumulative term distributions for documents of each category; and inputting each normalized text document, together with a term vector computed for the normalized text document and the category assigned to the text document, and the cumulative term distributions for documents of each category to the document classifier to train the document classifier to recognize a category to assign to an input normalized-text-document/term-vector pair.

16. The machine-readable medium of claim 13, wherein obtaining uncategorized documents from electronic information sources further comprises using a web crawler.

17. The machine-readable medium of claim 13, wherein each term vector contains an occurrence count for each term in the normalized text document for which the term vector was computed.

* * * * *

UNITED STATES PATENT AND TRADEMARK OFFICE
CERTIFICATE OF CORRECTION

| | | |
|---|---|---|
| PATENT NO. | : 7,917,492 B2 | Page 1 of 1 |
| APPLICATION NO. | : 12/077591 | |
| DATED | : March 29, 2011 | |
| INVENTOR(S) | : David Bargeron et al. | |

It is certified that error appears in the above-identified patent and that said Letters Patent is hereby corrected as shown below:

In the Specification

Column 8, line 45, please delete "$m^{-1}$", and insert -- m-1 --;

Column 17, line 4, please delete "IL", and insert -- ID --.

Signed and Sealed this

Second Day of August, 2011

David J. Kappos
*Director of the United States Patent and Trademark Office*